(12) United States Patent
Kwon et al.

(10) Patent No.: US 12,114,383 B2
(45) Date of Patent: *Oct. 8, 2024

(54) APPARATUS AND METHOD FOR MULTI-LINK COMMUNICATIONS

(71) Applicant: NXP USA, INC., Austin, TX (US)

(72) Inventors: Young Hoon Kwon, Laguna Niguel, CA (US); Liwen Chu, San Ramon, CA (US); Hongyuan Zhang, Fremont, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,099

(22) Filed: Jun. 6, 2023

(65) Prior Publication Data

US 2023/0319927 A1   Oct. 5, 2023

Related U.S. Application Data

(63) Continuation of application No. 17/094,691, filed on Nov. 10, 2020, now Pat. No. 11,672,038.

(60) Provisional application No. 62/980,176, filed on Feb. 22, 2020, provisional application No. 62/957,154, filed on Jan. 4, 2020, provisional application No. 62/933,859, filed on Nov. 11, 2019.

(51) Int. Cl.
| | |
|---|---|
| *H04W 76/15* | (2018.01) |
| *H04W 72/121* | (2023.01) |
| *H04W 72/23* | (2023.01) |
| *H04W 76/11* | (2018.01) |
| H04W 84/12 | (2009.01) |

(52) U.S. Cl.
CPC ........ *H04W 76/15* (2018.02); *H04W 72/121* (2013.01); *H04W 72/23* (2023.01); *H04W 76/11* (2018.02); *H04W 84/12* (2013.01)

(58) Field of Classification Search
None
See application file for complete search history.

(56) References Cited

U.S. PATENT DOCUMENTS

2021/0029588 A1* 1/2021 Cariou ............... H04W 40/244
2021/0037583 A1* 2/2021 Seok .................... H04W 76/15

\* cited by examiner

*Primary Examiner* — Kouroush Mohebbi

(57) ABSTRACT

Embodiments of an apparatus and method are disclosed. In an embodiment, a method of multi-link communications involves at an access point (AP) multi-link device, allocating Association IDs (AIDs) to non-AP multi-link devices, including allocating one of the AIDs to each of the non-AP multi-link devices, and at the AP multi-link device, generating a first indication element for the AIDs to indicate a buffered data configuration at the AP multi-link device for the non-AP multi-link devices.

25 Claims, 13 Drawing Sheets

APPARATUS AND METHOD FOR MULTI-LINK COMMUNICATIONS

CROSS-REFERENCE TO RELATED APPLICATIONS

This application is entitled to the benefit of U.S. Provisional Patent Application Ser. No. 62/933,859, filed on Nov. 11, 2019, U.S. Provisional Patent Application Ser. No. 62/957,154, filed on Jan. 4, 2020, and U.S. Provisional Patent Application Ser. No. 62/980,176, filed on Feb. 22, 2020, which are incorporated herein by reference.

BACKGROUND

In multi-link communications, an access point (AP) multi-link device (MLD), e.g., an AP multi-link logical device or an AP multi-link logical entity (MLLE), can buffer data and transmit buffered data to a non-AP multi-link device through one or more communications links. For example, a wireless AP multi-link device may wirelessly transmit buffered data to one or more wireless stations in a non-AP multi-link device through one or more wireless communications links. To facilitate the proper transmission of buffered data between an AP multi-link device and a corresponding non-AP multi-link device, communications signaling information (e.g., information related to buffered data and/or communications links) needs to be exchanged between the AP multi-link device and the corresponding non-AP multi-link device. However, typical multi-link communications technology may not be able to efficiently convey communications signaling information within a multi-link communications system. Therefore, there is a need for multi-link communications technology that can efficiently convey communications signaling information within a multi-link communications system.

SUMMARY

Embodiments of an apparatus and method are disclosed. In an embodiment, a method of multi-link communications involves at an access point (AP) multi-link device, allocating Association IDs (AIDs) to non-AP multi-link devices, including allocating one of the AIDs to each of the non-AP multi-link devices, and at the AP multi-link device, generating a first indication element for the AIDs to indicate a buffered data configuration at the AP multi-link device for the non-AP multi-link devices.

In an embodiment, a method of multi-link communications involves at an AP multi-link device, allocating AIDs to non-AP multi-link devices, comprising allocating one of the AIDs to each of the non-AP multi-link devices, and at the AP multi-link device, generating a first indication element for the AIDs to indicate a buffered data configuration at the AP multi-link device for the non-AP multi-link devices.

In an embodiment, the method includes at the AP multi-link device, generating a second indication element to indicate communications link information associated with the buffered data configuration at the AP multi-link device.

In an embodiment, at the AP multi-link device, generating the second indication element to indicate the communications link information associated with the buffered data configuration at the AP multi-link device includes at the AP multi-link device, generating a link mapping bitmap (LMB) for each of the AIDs whose corresponding non-AP multi-link device the AP multi-link device has a buffered data unit to be delivered to, wherein the LMB indicates a set of designated communications links through which the buffered data unit is to be delivered.

In an embodiment, the buffered data unit is an individually addressed buffered data unit.

In an embodiment, the method further includes from the AP multi-link device, transmitting the first indication element and the second indication element to the non-AP multi-link devices in a broadcast frame.

In an embodiment, the broadcast frame comprises a beacon frame.

In an embodiment, at the AP multi-link device, generating the second indication element to indicate the communications link information associated with the buffered data configuration at the AP multi-link device comprises at the AP multi-link device, generating an LMB only for each of the AIDs whose corresponding non-AP multi-link device the AP multi-link device has an individually addressed buffered data unit to be delivered to, where the LMB indicates a designated set of communications links through which the individually addressed buffered data unit is to be delivered.

In an embodiment, at the AP multi-link device, generating the first indication element for the AIDs to indicate the buffered data configuration at the AP multi-link device for the non-AP multi-link devices comprises at the AP multi-link device, for each AID of the AIDS, setting a corresponding traffic indication map (TIM) component to a specific value when the AP multi-link device has buffered data to be delivered to a corresponding non-AP multi-link device to which the AID is allocated.

In an embodiment, the corresponding TIM component comprises a TIM bit, and the specific value is 1.

In an embodiment, the buffered data configuration at the AP multi-link device comprises information regarding an individually addressed buffered data unit and a group addressed buffered data unit at the AP multi-link device, and at the AP multi-link device, generating the first indication element for the AIDs to indicate the buffered data configuration at the AP multi-link device for the non-AP multi-link devices comprises at the AP multi-link device, generating a traffic indication map (TIM) that includes a first section containing information regarding the individually addressed buffered data unit and a second section containing information regarding the group addressed buffered data, where the first and second sections have non-overlapping AID ranges within the AIDs.

In an embodiment, the AP multi-link device and the non-AP multi-link devices are compatible with an Institute of Electrical and Electronics Engineers (IEEE) 802.11 protocol.

In an embodiment, a multi-link communications system includes an AP multi-link device configured to allocate AIDs to non-AP multi-link devices by allocating one of the AIDs to each of the non-AP multi-link devices and generate an indication element for the AIDs to indicate a buffered data configuration at the AP multi-link device for the non-AP multi-link devices, and the non-AP multi-link devices.

In an embodiment, the AP multi-link device and the non-AP multi-link devices are compatible with an IEEE 802.11 protocol.

In an embodiment, a method of multi-link communications involves at an AP multi-link device, mapping communications links that are affiliated with the AP multi-link device to traffic identifiers (TIDs) for a non-AP multi-link device, at the AP multi-link device, generating an indication element to indicate that the AP multi-link device has buffered data for a first TID of the TIDs for a the non-AP multi-link device, and transmitting the indication element from the AP multi-link device to the non-AP multi-link device.

In an embodiment, transmitting the indication element from the AP multi-link device to the non-AP multi-link device associated with the first TID comprises broadcasting the indication element from the AP multi-link device in a broadcasting frame.

In an embodiment, the broadcast frame comprises a beacon frame.

In an embodiment, the method further comprises receiving, by the AP multi-link device, a station operation status indication from the non-AP multi-link device, where the station operation status indication contains information regarding which station affiliated with the non-AP multi-link device is to be in an awake state.

In an embodiment, the method further comprises transmitting the buffered data from the AP multi-link device to the non-AP multi-link device through one of the communications links that corresponds to the first TID when a station of the non-AP multi-link device operating on the one of the communications links associated with the first TID is to be in the awake state.

In an embodiment, the method further comprises at the AP multi-link device, setting a corresponding traffic indication map (TIM) component of the non-AP multi-link device to a specific value.

In an embodiment, the corresponding TIM component comprises a TIM bit, and the specific value is 1.

In an embodiment, the indication element comprises a bitmap.

In an embodiment, the method further comprises transmitting the buffered data from the AP multi-link device to the non-AP multi-link device through one of the communications links that does not correspond to the first TID when no station of the non-AP multi-link device operating on any of the communications links associated with the first TID is to be in an awake state.

In an embodiment, a method of multi-link communications involves at an AP multi-link device, mapping a first group of communications links to a first TID and a second group of communications links to a second TID for transmission of data to a non-AP multi-link device, where the first group of communications links and the second group of communications links are subset of communications links that are affiliated with the AP multi-link device, at the AP multi-link device, generating an indication element to indicate that the AP multi-link device has buffered data for the first TID and the second TID, at the AP multi-link device, receiving an indication from the non-AP multi-link device that the non-AP multi-link device is in sleep state for all of the first group of communications links, and that the non-AP multi-link device is in active state on a third communications link, where the third communications link is within the second group of communications links, and from the AP multi-link device, transmitting the buffered data to the non-AP multi-link device through the third communications link.

In an embodiment, the buffered data is not transmitted through the first group of links.

In an embodiment, the AP multi-link device and the non-AP multi-link devices are compatible with an IEEE 802.11 protocol.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
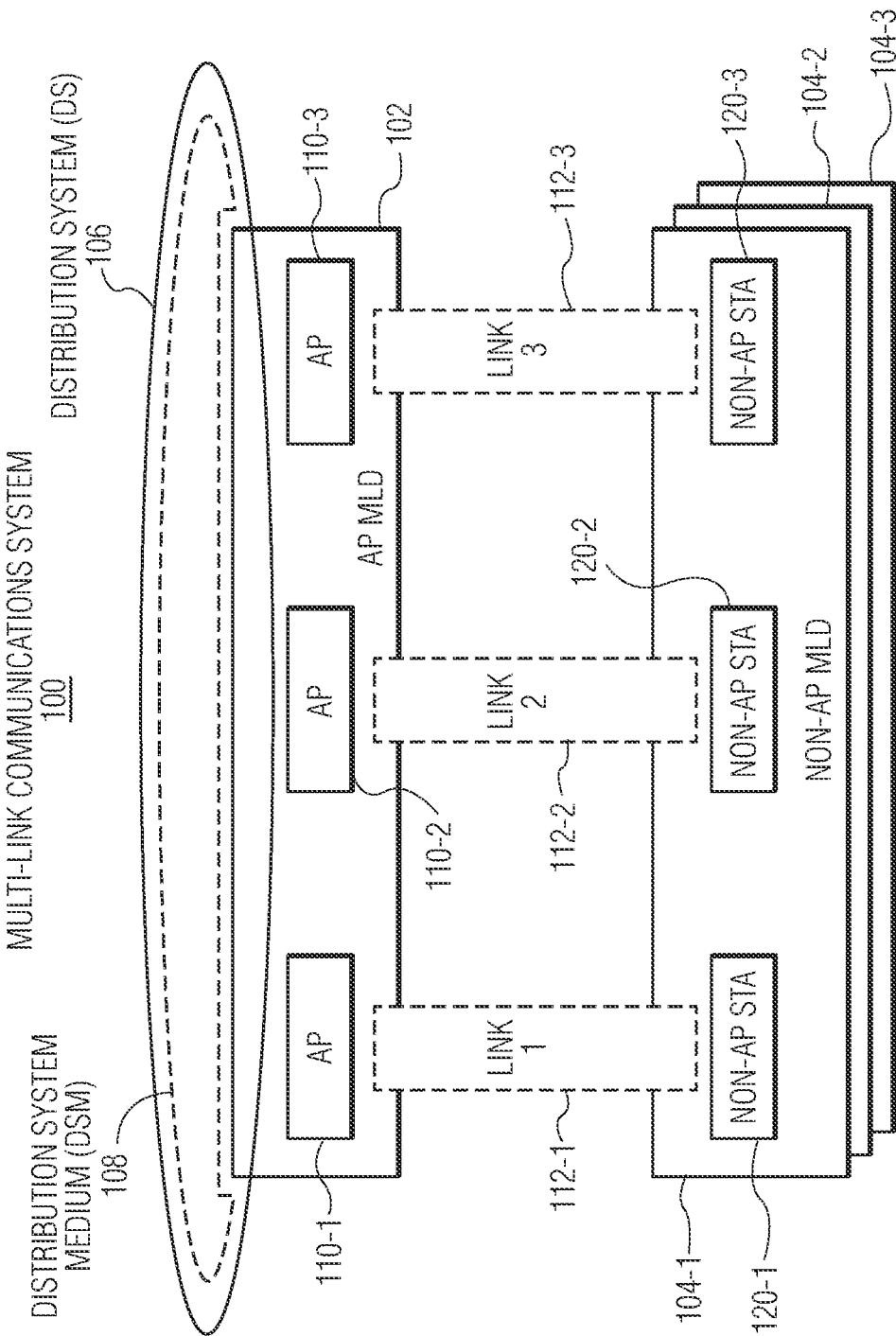
FIG. 1 depicts a multi-link communications system in accordance with an embodiment of the invention.

FIG. 1 depicts a multi-link communications system 100 in accordance with an embodiment of the invention. In the embodiment depicted in FIG. 1, the multi-link communications system includes at least one AP (MLD) 102, and multiple non-AP MLDs 104-1, 104-2, 104-3. The multi-link communications system can be used in various applications, such as industrial applications, medical applications, computer applications, and/or consumer or appliance applications. In some embodiments, the multi-link communications system is a wireless communications system, such as a wireless communications system compatible with an Institute of Electrical and Electronics Engineers (IEEE) 802.11 protocol. For example, the multi-link communications system may be a wireless communications system compatible with an IEEE 802.11be protocol. In some embodiments, the multi-link communications system includes one or more AP MLLEs and/or one or more non-AP MLLEs. Although the depicted multi-link communications system 100 is shown in FIG. 1 with certain components and described with certain functionality herein, other embodiments of the multi-link communications system 100 may include fewer or more components to implement the same, less, or more functionality. For example, in some embodiments, the multi-link communications system includes multiple AP MLDs, more than three non-AP MLDs, and/or less than three non-AP MLDs. In yet another example, although the multi-link communications system 100 is shown in FIG. 1 as being connected in a certain topology, the network topology of the multi-link communications system 100 is not limited to the topology shown in FIG. 1.

In the embodiment depicted in FIG. 1, the AP MLD 102 includes multiple APs 110-1, 110-2, 110-3. The APs 110-1, 110-2, 110-3 may be implemented in hardware (e.g., circuits), software, firmware, or a combination thereof. The APs 110-1, 110-2, 110-3 may be fully or partially implemented as an integrated circuit (IC) device. In some embodiments, the APs 110-1, 110-2, 110-3 are wireless APs compatible with at least one WLAN communications protocol (e.g., at least one IEEE 802.11 protocol). For example, the APs 110-1, 110-2, 110-3 may be wireless APs compatible with an IEEE 802.11be protocol. In some embodiments, an AP is a wireless AP that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, an AP includes at least one antenna, at least one transceiver operably connected to the at least one antenna, and at least one controller operably connected to the corresponding transceiver. In some embodiments, the least one transceiver includes a physical layer (PHY) device. The at least one controller operably may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. Each of the APs 110-1, 110-2, 110-3 of the AP MLD may operate in a different frequency band. For example, the AP 110-1 may operate in 2.4 gigahertz (GHz) frequency band, the AP 110-2 may operate in 5 GHz frequency band, and the AP 110-3 may operate in 6 GHz frequency band. In the embodiment depicted in FIG. 1, the AP MLD is connected to a distribution system (DS) 106 through a distribution system medium (DSM) 108. The distribution system (DS) 106 may be a wired network or a wireless network that is connected to a backbone network such as the Internet. The DSM 108 may be a wired medium (e.g., Ethernet cables, telephone network cables, or fiber optic cables) or a wireless medium (e.g., infrared, broadcast radio, cellular radio, or microwaves). Although the AP MLD 102 is shown in FIG. 1 as including three APs, other embodiments of the AP MLD 102 may include fewer than three APs or more than three APs. In addition, although some examples of the DSM 108 are described, the DSM 108 is not limited to the examples described herein.

In the embodiment depicted in FIG. 1, the non-AP MLD 104-1 includes multiple non-AP stations (STAs) 120-1, 120-2, 120-3. The STAs 120-1, 120-2, 120-3 may be implemented in hardware (e.g., circuits), software, firmware, or a combination thereof. The STAs 120-1, 120-2, 120-3 may be fully or partially implemented as an IC device. In some embodiments, the non-AP STAs 120-1, 120-2, 120-3 are wireless devices that wirelessly connect to wireless APs. For example, at least one of the non-AP STAs 120-1, 120-2, 120-3 may be a laptop, a desktop personal computer (PC), a mobile phone, or other wireless device that supports at least one WLAN communications protocol. In some embodiments, the non-AP STAs 120-1, 120-2, 120-3 are wireless devices compatible with at least one IEEE 802.11 protocol (e.g., an IEEE 802.11be protocol). In some embodiments, the non-AP MLD has one Media Access Control (MAC) data service interface. In an embodiment, a single address is associated with the MAC data service interface and is used to communicate on the DSM 108. In some embodiments, the AP MLD 102 and/or the non-AP MLDs 104-1, 104-2, 104-3 identify which communications links support the multi-link operation during a multi-link operation setup phase and/or exchanges information regarding multi-link capabilities during the multi-link operation setup phase. Each of the non-AP STAs 120-1, 120-2, 120-3 of the non-AP MLD may operate in a different frequency band. For example, the non-AP STA 120-1 may operate in 2.4 GHz frequency band, the non-AP STA 120-2 may operate in 5 GHz frequency band, and the non-AP STA 120-3 may operate in 6 GHz frequency band. Each of the non-AP MLDs 104-2, 104-3 may be the same as or similar to the non-AP MLD 104-1. For example, the non-AP MLD 104-2 or 104-3 includes multiple non-AP STAs. In some embodiments, each STA includes at least one antenna, at least one transceiver operably connected to the at least one antenna, and at least one controller connected to the corresponding transceiver. In some embodiments, the at least one transceiver includes a PHY device. The at least one controller operably may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver. In the embodiment depicted in FIG. 1, the non-AP MLD 104-1, 104-2, or 104-3 communicates with the AP MLD 102 through multiple communications links 112-1, 112-2, 112-3. For example, each of the non-AP STAs 120-1, 120-2, 120-3 communicates with an AP 110-1, 110-2, or 110-3 through a corresponding communications link 112-1, 112-2, or 112-3. Although the non-AP MLD 104-1 is shown in FIG. 1 as including three non-AP STAs, other embodiments of the non-AP MLD 104-1 may include fewer than three non-AP STAs or more than three non-AP STAs. In addition, although the AP MLD 102 communicates (e.g., wirelessly communicates) with the non-AP MLDs 104-1, 104-2, 104-3 through multiple links 112-1, 112-2, 112-3, in other embodiments, the AP MLD 102 may communicate (e.g., wirelessly communicates) with the non-AP MLDs through more than three communications links or less three than communications links.

In a multi-link operation, an AP multi-link device (e.g., an AP MLD) typically broadcasts traffic indication map (TIM) information, where the TIM information includes buffered data information on one or more communications links. Under a single TIM configuration, a non-AP multi-link device (e.g., a STA MLD) can have multiple Association IDs (AIDs), with one AID per link. A single TIM element can include a STA in multiple links. Under a multiple TIM configuration, each TIM corresponds to one link. Consequently, if an AP needs to indicate TIM information on multiple links, the AP can include a separate TIM (sub) element in a beacon frame. Under both a single TIM configuration and a multiple TIM configuration, a TIM element indication may include an indication of whether there is a buffered data frame for a station (STA) and information regarding to which link(s) these buffered data can be delivered if there is a buffered data frame for the STA. In case there is no buffered data frame for a STA, the second indication (i.e., information regarding which link buffered data can be delivered) does not need to be delivered. However, in a typical multi-link operation, there are generally more stations (STAs) whose TIM bit is set to zero than STAs whose TIM bit is set to one in a beacon frame. Under both single TIM and multiple TIMs configurations, more than one bit can be allocated for each STA regardless of buffered data status, and consequently, redundant signaling overhead exists under both single TIM and multiple TIM configurations. In addition, under both single TIM configuration and multiple TIM configuration, extended TIM overhead may occur. For example, under single TIM configuration, due to increased AID space, the partial bitmap size of a TIM element may be longer than the partial bitmap size of a TIM element under a single link case. Under a multiple TIM configuration, a beacon frame needs to include multiple TIM (sub)elements, which can cause TIM overhead.

In some embodiments, an AP multi-link device (e.g., the AP MLD 102) is configured to operate under a single TIM configuration to maintain backward compatibility and allocate one Association ID (AID) per association. In an embodiment, the AP MLD is configured to allocate one AID per STA MLD. For example, the AP MLD allocates one AID to the non-AP MLD 104-1. Each of the non-AP STAs 120-1, 120-2, 120-3 of the non-AP MLD 104-1 may have the same AID as the non-AP MLD 104-1. However, it does not preclude a STA MLD from having more than one AID. In an embodiment, regardless of a specific communications link within the AP MLD, as long as there is buffered data for a STA MLD (e.g., the non-AP MLD 104-1), the AP MLD is configured to set a TIM bit corresponding to the STA MLD to a specific value (e.g., 1). In addition to TIM information that indicates buffered data for a STA MLD (e.g., the non-AP MLD 104-1), the AP MLD is configured to define a link indication element to indicate in which communications link associated with the STA MLD buffered data is to be delivered. For example, the AP MLD may set a component of the link indication element, which corresponds to the communications link associated with the STA MLD in which the buffered data is to be delivered, to a specific value (e.g., 1).

In some embodiments, an AP multi-link device (e.g., the AP MLD 102) is configured to define a link mapping bitmap (LMB) per AID, where each bit within the LMB per AID indicates a designated communications link within a STA MLD (e.g., the non-AP MLD 104-1) corresponding to the AID. In some embodiments, each bit within the LMB per AID indicates a set of designated communications links within a STA MLD (e.g., the non-AP MLD 104-1) corresponding to the AID. Before an AP MLD transmits a data frame to a STA MLD, the AP MLD indicates the size of the LMB per AID and which communications link corresponds to which bit within the LMB per AID of the STA MLD. This indication can be done during a multi-link association process. In some embodiments, the indication information is broadcasted in a beacon frame. In some embodiments, the indication information is indicated by a probe response frame or a (Re)association response frame. The AP MLD can allocate one or more AIDs to a STA MLD for a multi-link association. In some embodiments, in normal operation, the AP MLD is configured to assign a single AID to a STA MLD. However, in some situations, the AP MLD may assign more than one AID to a STA MLD. In some embodiments, the AP MLD is configured to assign multiple AIDs to a STA MLD if the number of communications links that the AP MLD supports is more than the size of the LMB per AID. For example, if the AP MLD supports 8 links and the AP MLD maintains an LMB per AID of 2 bits (i.e., 4 links per LMB per AID), the AP MLD may assign two AIDs to each STA MLD.

In some embodiments, an AP multi-link device (e.g., the AP MLD 102) is configured to transmit a frame (e.g., a beacon frame) containing a single TIM element. Each bit in the TIM element may correspond to traffic buffered for a non-AP MLD that the AP MLD with which an AP is affiliated is prepared to deliver when the frame (e.g., a beacon frame) is transmitted. In an embodiment, bit number N indicates the status of buffered, individually addressed MAC Protocol Data Units (MPDUs)/MAC Protocol Data Units (MMPDUs) for a STA or a non-AP MLD whose AID is N, or group addressed MSDUs/MMPDUs for STAs whose group AID is N.

In some embodiments, an AP multi-link device (e.g., the AP MLD 102) is configured to transmit a frame (e.g., a beacon frame) containing a single TIM to a STA MLD (e.g., the non-AP MLD 104-1). In an embodiment, the AP MLD 102 is configured to set, for each AID, a corresponding TIM bit to a specific value (e.g., 1) if there is buffered data for the AID regardless of the specific communications link associated with a STA MLD that is mapped to the AID in which the buffered data is to be delivered. In addition to the TIM element (e.g., transmitted subsequently to the TIM element), the AP MLD 102 is configured to define a buffered data to link mapping (BLM) element. The BLM element may include a link mapping bitmap (LMB). In some embodiments, the size of the LMB is represented as N_TIM*N_bitmap, where N_TIM denotes the number of AIDs whose corresponding TIM bit is set to a specific value (e.g., 1), which indicates there is buffered data to be delivered to a STA MLD having the AID, and N_bitmap denotes the size of LMB per AID. In some embodiments, the location of LMB per AID is predefined. For example, an LMB is listed in monotonically increasing order of LMB per AID for those AIDs whose TIM bit is set to a specific value (e.g., 1), indicating there is buffered data to be delivered to the AID. In some embodiments, a STA MLD (e.g., the non-AP MLD 104-1) identifies that the AP MLD 102 has buffered frames for the STA MLD by identifying that a TIM element received from the AP MLD contains a TIM bit corresponding to the STA MLD's AID that is set to a specific value (e.g., 1). In some embodiments, when a STA MLD (e.g., the non-AP MLD 104-1) identifies in a TIM element received from the AP MLD containing a TIM bit corresponding to the STA MLD's AID is set to 1, the STA MLD further checks the LMB corresponding to the AID and identifies specific communications link(s) that the buffered traffic is to be delivered.

Figure 2:
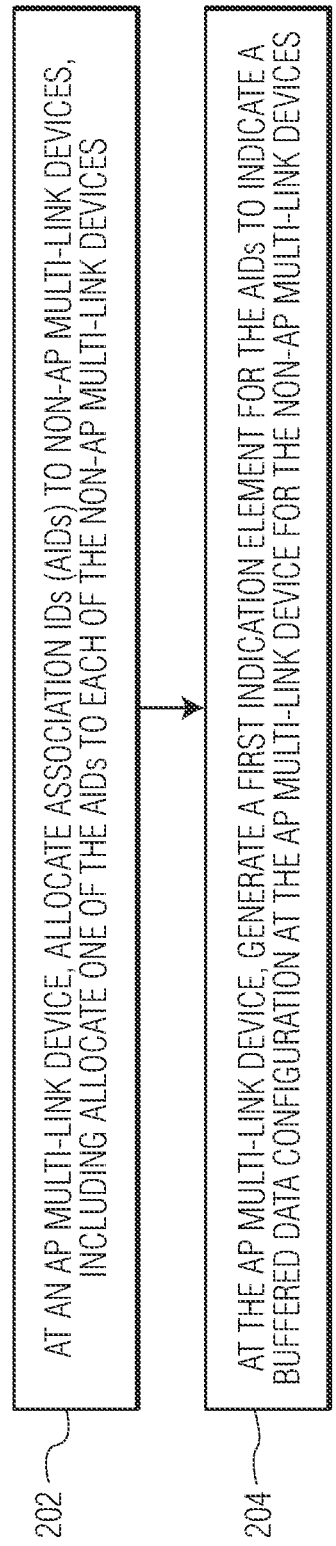
FIG. 2 is a process flow diagram of a method of multi-link communications in accordance to an embodiment of the invention.

FIG. 2 is a process flow diagram of a method of multi-link communications in accordance to an embodiment of the invention. According to the method, at block 202, at an AP multi-link device, Association IDs (AIDs) are allocated to non-AP multi-link devices by allocating one of the AIDs to each of the non-AP multi-link devices. At block 204, at the AP multi-link device, a first indication element for the AIDs is generated to indicate a buffered data configuration at the AP multi-link device for the non-AP multi-link devices. The AP multi-link device may generate a second indication element to indicate communications link information associated with the buffered data configuration at the AP multi-link device. For example, the AP multi-link device may generate a link mapping bitmap (LMB) for each of the AIDs whose corresponding non-AP multi-link device the AP multi-link device has a buffered data unit to be delivered to. The LMB may indicate one or more designated communications links (e.g., a set of designated communications links) through which the buffered data unit is to be delivered. The buffered data unit may be an individually addressed buffered data unit. The AP multi-link device may transmit the first indication element and the second indication element to the non-AP multi-link devices in a broadcast frame, which may be a beacon frame. The AP multi-link device may generate an LMB only for each of the AIDs whose corresponding non-AP multi-link device the AP multi-link device has an individually addressed buffered data unit to be delivered to. The LMB may indicate one or more designated communications links (e.g., a designated set of communications links) through which the individually addressed buffered data unit is to be delivered. The AP multi-link device, may, for each AID of the AIDS, set a corresponding traffic indication map (TIM) component to a specific value when the AP multi-link device has buffered data to be delivered to a corresponding non-AP multi-link device to which the AID is allocated. In some embodiments, the corresponding TIM component includes a TIM bit, and the specific value is 1. In some embodiments, the buffered data configuration at the AP multi-link device includes information regarding an individually addressed buffered data unit and a group addressed buffered data unit at the AP multi-link device. The AP multi-link device may generate a traffic indication map (TIM) that includes a first section containing information regarding the individually addressed buffered data unit and a second section containing information regarding the group addressed buffered data. The first and second sections may have non-overlapping AID ranges within the AIDs. In some embodiments, the AP multi-link device and the non-AP multi-link devices are compatible with an IEEE 802.11 protocol. The AP multi-link device may be similar to, the same as, or a component of the AP MLD 102 depicted in FIG. 1. The non-AP multi-link devices may be similar to, the same as, or a component of the non-AP MLDs 104-1, 104-2, 104-3 depicted in FIG. 1.

Figure 3:
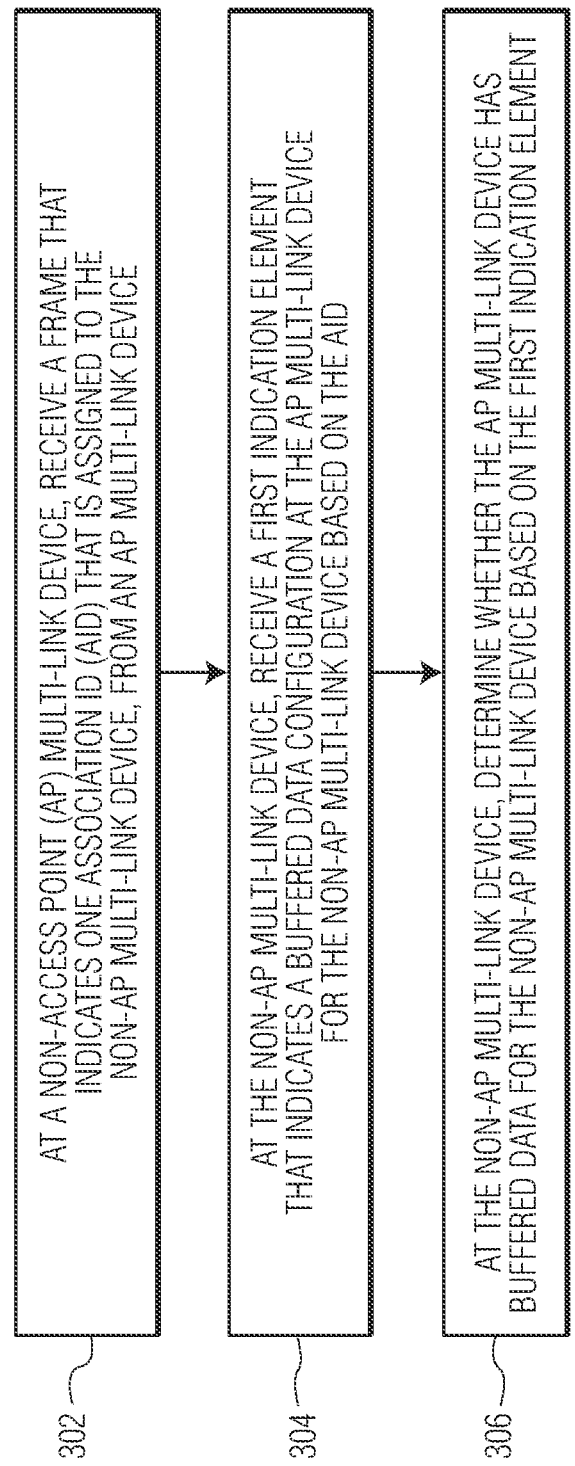
FIG. 3 is a process flow diagram of a method of multi-link communications in accordance to an embodiment of the invention.

FIG. 3 is a process flow diagram of a method of multi-link communications in accordance to an embodiment of the invention. According to the method, at block 302, at a non-AP multi-link device, a frame that indicates or includes one AID that is assigned to the non-AP multi-link device, is received from an AP multi-link device. At block 304, at the non-AP multi-link device, a first indication element that indicates a buffered data configuration at the AP multi-link device for the non-AP multi-link device based on the AID is received. At block 306, at the non-AP multi-link device, whether the AP multi-link device has buffered data for the non-AP multi-link device based on the first indication element is determined. In some embodiments, the non-AP multi-link device receives a second indication element that indicates communications link information associated with the buffered data configuration at the AP multi-link device and determines one or more communications links (e.g., a set of communications links) through which the buffered data is delivered based on the second indication element. The second indication element may include an LMB that indicates the communications link(s) through which the buffered data is to be delivered. The buffered data unit may be an individually addressed buffered data unit. The non-AP multi-link device may receive the first indication element from a broadcast frame from the AP multi-link device. In some embodiments, the first indication element includes a TIM component that is set to a specific value when the AP multi-link device has buffered data to be delivered to the non-AP multi-link device. In some embodiments, the buffered data configuration at the AP multi-link device includes information regarding an individually addressed buffered data unit and a group addressed buffered data unit at the AP multi-link device. The first indication element may include a traffic indication map (TIM) that includes a first section containing information regarding the individually addressed buffered data unit and a second section containing information regarding the group addressed buffered data. The first and second sections may have non-overlapping AID ranges. In some embodiments, the AP multi-link device and the non-AP multi-link devices are compatible with an IEEE 802.11 protocol. The AP multi-link device may be similar to, the same as, or a component of the AP MLD 102 depicted in FIG. 1. The non-AP multi-link device may be similar to, the same as, or a component of the non-AP MLDs 104-1, 104-2, 104-3 depicted in FIG. 1.

Figure 4:
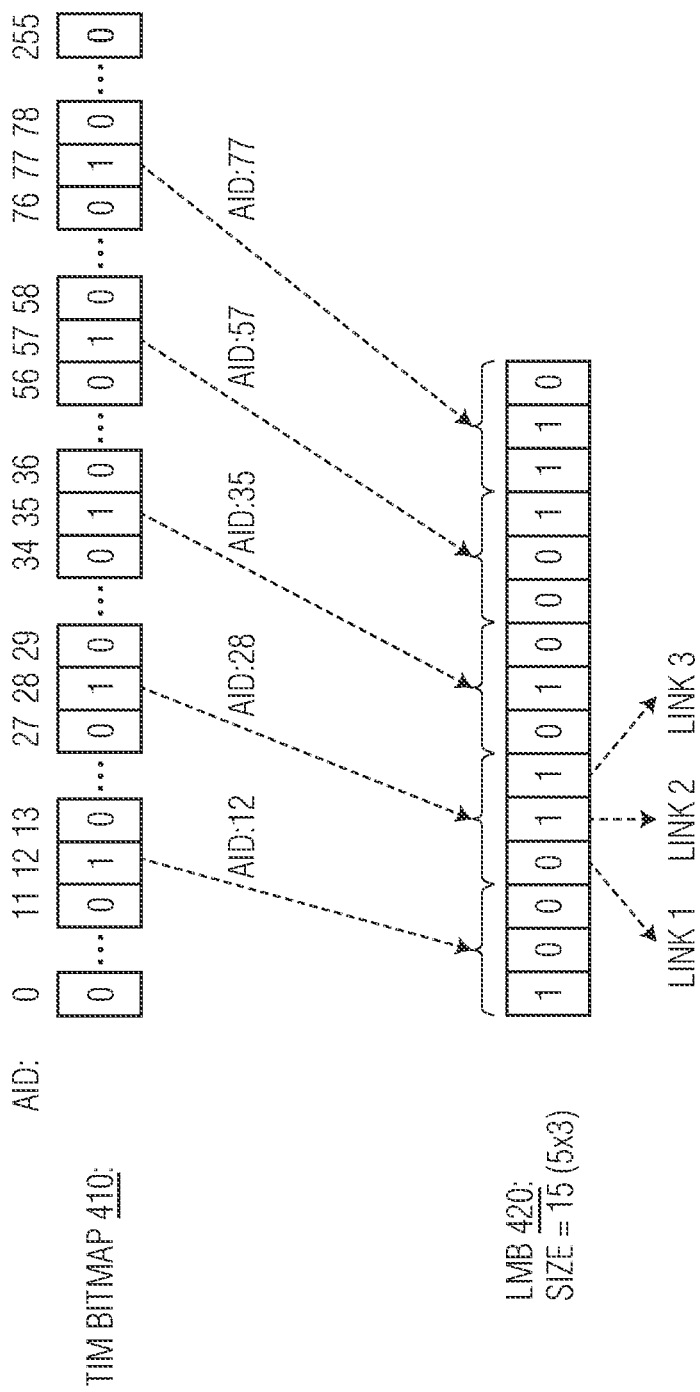
FIG. 4 depicts a TIM bitmap and a corresponding link mapping bitmap (LMB) that can be used in a multi-link operation by the multi-link communications system depicted in FIG. 1.

FIG. 4 depicts a TIM bitmap 410 and a corresponding link mapping bitmap (LMB) 420 that can be used in a multi-link operation by the multi-link communications system 100 depicted in FIG. 1. In the example depicted in FIG. 4, the AP MLD 102 is associated with 256 STA MLDs and supports three communications links. The AP MLD 102 generates the TIM bitmap for the associated 256 STA MLDs with different AIDs and the LMB for STA MLDs for which the AP MLD has buffered data. As depicted in FIG. 4, each LMB per AID is composed of three bits and each communications link (e.g., first link, second link, or third link) corresponds to a respective bit (e.g., first bit, second bit, or third bit) of the LMB per AID. Out of the 256 STA MLDs, the AP MLD has buffered data for 5 STA MLDs, which have corresponding AIDs, 12, 28, 35, 57, and 77. The size of the LMB is only 15 bits (i.e., 5 STAs×3 bit per STA), instead of 756 bits for all of the 256 STA MLDs.

In some embodiments, buffered data to link mapping does not include a bitmap. For example, if the size of the LMB per AID is N bits (N being an integer), it can indicate $2^N$ different states or different link combinations. If the LMB per AID is a simple bitmap, it can indicate state [0,,,0], which implies there is no communications link to deliver the buffered data. As the LMB per AID is used only for those AIDs to which buffered data are to be delivered, at least one communications link should be indicated. Therefore, this state [0,,,0] may never happen, and this state is wasted. To deal with this problem, in some embodiments, an AP multi-link device (e.g., the AP MLD 102) is configured to indicate a corresponding communications link combination for each of $2^N$ states of LMB per STA MLD. In some embodiments, the state [0,,,0] has a special implication, such as, a communications link will be selected per a STA MLD's request, a special transmission scheme (e.g., multi-AP joint transmission) is expected, or the use of a predetermined communications link.

In some embodiments, an AP multi-link device (e.g., the AP MLD 102) is configured to define an LMB per AID, not an LMB per STA MLD. For example, if a STA MLD (e.g., the non-AP MLD 104-1) is assigned more than one AID by the AP MLD 102, the AP MLD 102 is configured to define more than one LMB for the STA MLD. If one AID (e.g., a broadcast AID) corresponds to more than one STA MLD, the more than one STA MLD that correspond to the AID need to check the LMB for buffered data status. In some embodiments, the size of the LMB is a multiple of octets. If N_TIM*N_bitmap (where N_TIM denotes the number of AIDs whose corresponding TIM bit is set to a specific value (e.g., 1), indicating there is buffered data to be delivered to the AIDs, and N_bitmap denotes the size of LMB per AID) is not a multiple of 8, the AP MLD 102 may set the size of LMB to the smallest number that is a multiple of 8 and that is greater than N_TIM*N_bitmap.

In some embodiments, an AP multi-link device (e.g., the AP MLD 102) is configured to set the size of LMB per AID different for various AIDs. In an embodiment, the AP MLD may indicate a different bitmap size for different LMB per AID groups. For example, the AP MLD may determine that an LMB per AID includes N1 bit(s) if an AID is in the range of [0,,,M1], that an LMB per AID includes N2 bit(s) if an AID is in the range of [M1+1,,, M2], where N1, N2, M1, M2 are positive integers, and so on. When a STA MLD (e.g., the non-AP MLD 104-1) identifies that its corresponding TIM bit is set to a specific value (e.g., 1), the STA MLD calculates a location of the LMB per AID for the STA MLD within the LMB as follows. If those AIDs whose corresponding TIM bit is set to a specific value (e.g., 1) are within the range of [0,,,M1], N1 is considered in calculating the bitmap size, and if those AIDs whose corresponding TIM bit is set to 1 are within the range of [M1+1,,,M2], N2 is considered in calculating the bitmap size. In some embodiments, in the case in which the AP MLD supports a particular number (e.g., 3) of communications links but most of the STA MLDs support a smaller number (e.g., only 2) of communications links while a small number of STA MLDs support the particular number (e.g., 3) of links, the AP MLD configures AIDs as two groups. For example, for group 1 AID, the size of LMB per AID is 2 bits, and the AID range is [0,,,800], while for group 2 AID, the size of LMB per AID is 3 bits, and the AID range is [801,,,1000]. For a STA MLD that supports only 2 communications links, the STA MLD is indicated as a Group 1 member, while for a STA MLD that supports 3 communications links, the STA MLD is indicated as a Group 2 member. In another example, for group 1 AID, the size of the LMB per AID is 2 bits, and the AID range is [0,,,800], while for group 2 AID, the size of the LMB per AID is 1 bit, and the AID range is [801,,,1000]. For a STA MLD that supports only 2 communications links, the STA MLD is indicated as a Group 1 member, while for a STA MLD that supports 3 communications links, the STA MLD is indicated as both a Group 1 and Group 2 member, and 2 AIDs are allocated for the STA MLD (one from each group).

Figure 5:
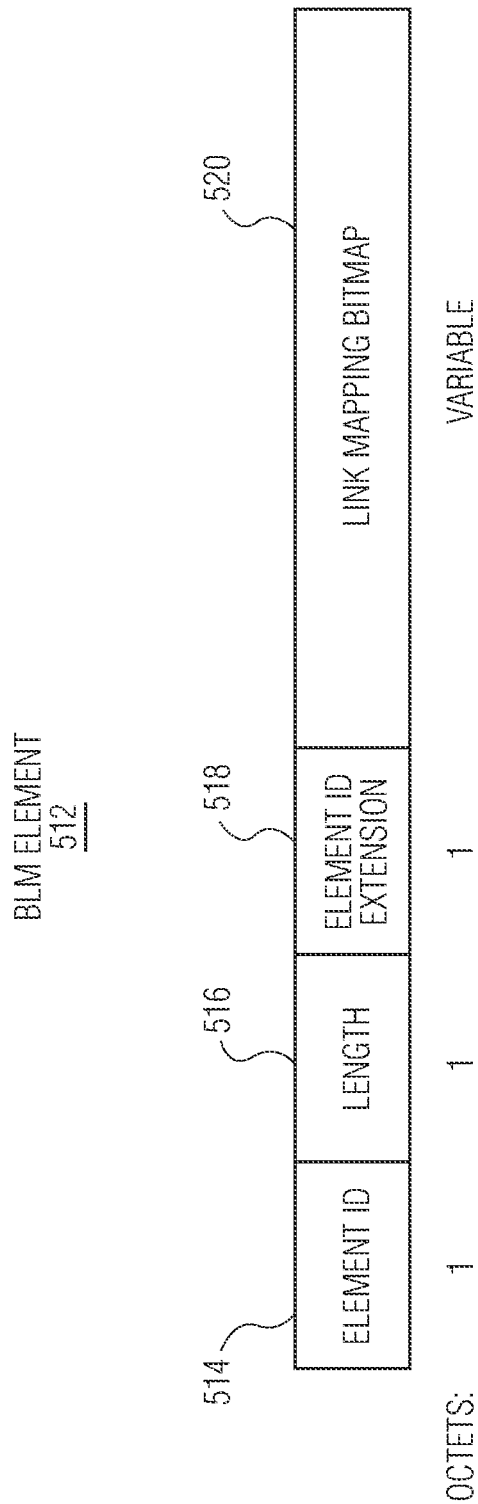
FIG. 5 depicts an example information element format for a buffered data to link mapping (BLM) element that can be used in a multi-link operation by the multi-link communications system depicted in FIG. 1.

FIG. 5 depicts an example information element format for a buffered data to link mapping (BLM) element 512 that can be used in a multi-link operation by the multi-link communications system 100 depicted in FIG. 1. In the example depicted in FIG. 5, the BLM element includes an element ID field 514 (e.g., 1 octet) that may contain identification information which specific element this element represents, a length field 516 (e.g., 1 octet) that may contain element length information, an element ID extension field 518 (e.g., 1 octet) that may include ID extension information, and a Link Mapping Bitmap (LMB) field 520, which may contain information regarding a communications link for delivering buffered data and have variable size. In some embodiments, the BLM element further includes some reserved (sub)field.

Figure 6:
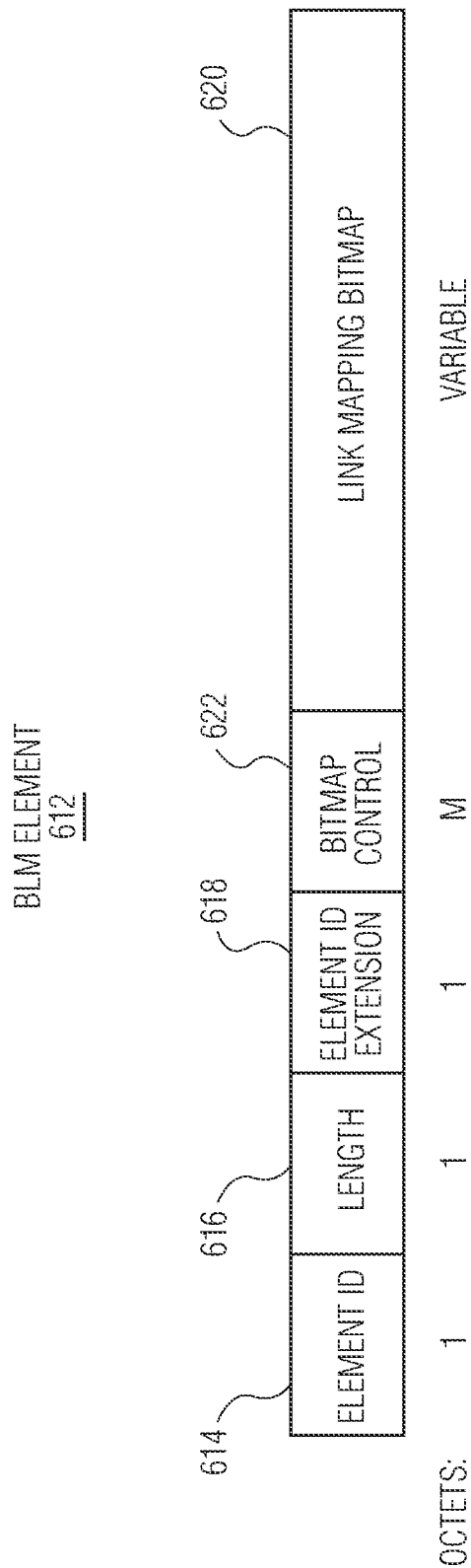
FIG. 6 depicts another example information element format for a BLM element that can be used in a multi-link operation by the multi-link communications system depicted in FIG. 1.

FIG. 6 depicts another example information element format for a BLM element 612 that can be used in a multi-link operation by the multi-link communications system 100 depicted in FIG. 1. Compared to the BLM element 512 depicted in FIG. 5, the BLM element 612 depicted in FIG. 6 includes an additional bitmap control data field 622. Specifically, in the example depicted in FIG. 6, the BLM element includes an element ID field 614 (e.g., 1 octet) that may contain identification information which specific element this element represents, a length data field 616 (e.g., 1 octet) that may contain element length information, an element ID extension field 618 (e.g., 1 octet) that may include ID extension information, an LMB field 620, which may contain information regarding a communications link for delivering buffered data and have variable size, and the bitmap control data field (e.g., M octet(s), where M is a positive integer). The bitmap control data field may contain control information regarding the configuration of LMB, where some examples of such control information may include the number of AID groups, size of each LMB per AID within the LMB for each AID group, the number of LMBs per AID within the LMB for each AID group, the range of AIDs for each AID group, and/or reserved (sub) field.

Figure 7:
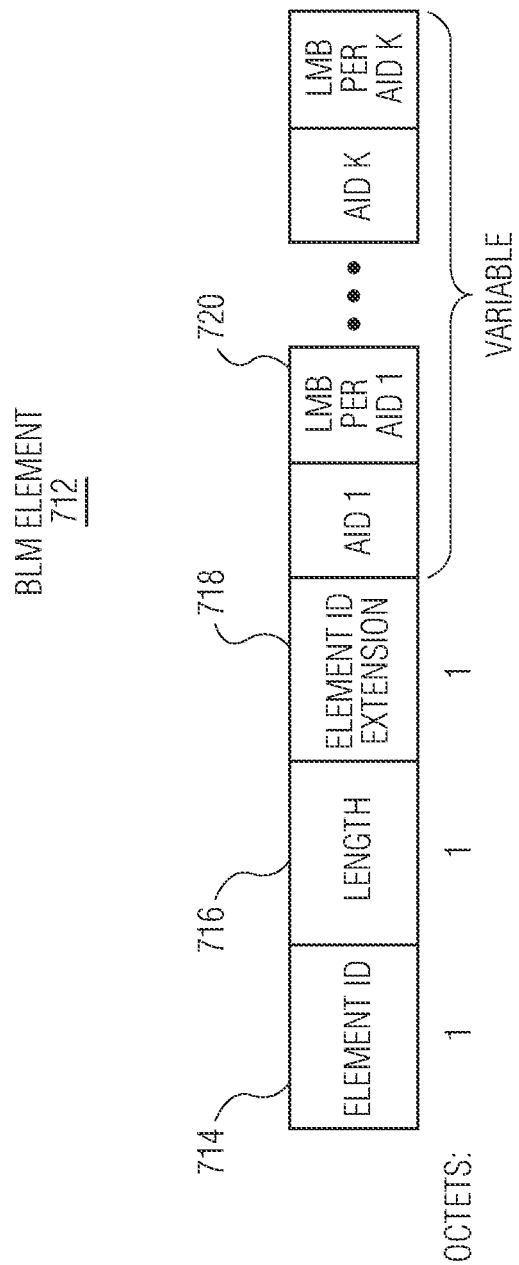
FIG. 7 depicts another example information element format for a BLM element that can be used in a multi-link operation by the multi-link communications system depicted in FIG. 1.

FIG. 7 depicts another example information element format for a BLM element 712 that can be used in a multi-link operation by the multi-link communications system 100 depicted in FIG. 1. Compared to the BLM element 612 depicted in FIG. 6, the BLM element 712 depicted in FIG. 7 includes an LMB field 720 that contains a direct indication of AID and LMB per AID for each AID. Specifically, in the example depicted in FIG. 7, the BLM element includes an element ID field 714 (e.g., 1 octet) that may contain identification information which specific element this element represents, a length field 716 (e.g., 1 octet) that may contain element length information, an element ID extension field 718 (e.g., 1 octet) that may include ID extension information, and the LMB field 720, which may contain information regarding a communications link for delivering buffered data and have variable size. Instead of relying on the TIM element to identify the location of the LMB per AID for each AID, the LMB data field contains a direct indication of AID and LMB per AID for each AID.

Figure 8:
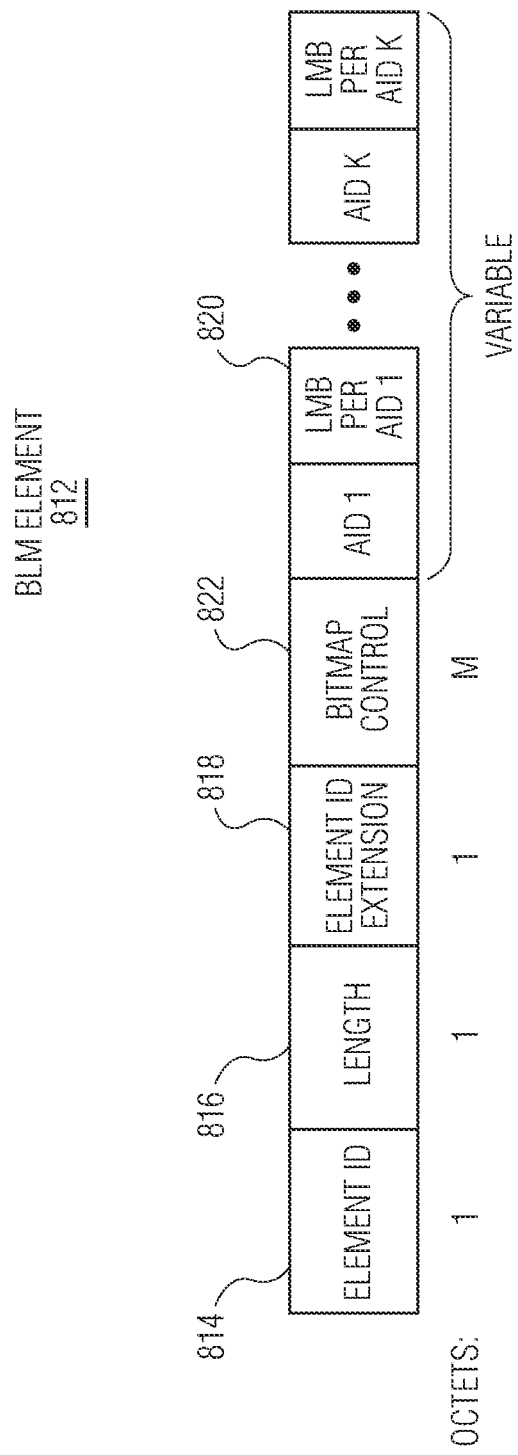
FIG. 8 depicts another example information element format for a BLM element that can be used in a multi-link operation by the multi-link communications system depicted in FIG. 1.

FIG. 8 depicts another example information element format for a BLM element 812 that can be used in a multi-link operation by the multi-link communications system 100 depicted in FIG. 1. Compared to the BLM element 712 depicted in FIG. 7, the BLM element 812 depicted in FIG. 8 includes an additional bitmap control field 822. Specifically, in the example depicted in FIG. 8, the BLM element 812 includes an element ID field 814 (e.g., 1 octet) that may contain identification information which specific element this element represents, a length field 816 (e.g., 1 octet) that may contain element length information, an element ID extension field 818 (e.g., 1 octet) that may include ID extension information, an LMB field 820 that allows a different bitmap size, and the bitmap control field (e.g., M octet(s), where M is a positive integer). The bitmap control field may contain control information regarding the configuration of LMB, where some examples of such control information may include the number of AID groups, size of each LMB per AID within LMB for each AID group, the number of LMB per AID within the LMB for each AID group, the range of AIDs for each AID group, and/or reserved (sub)field.

In some embodiments, using a Link Mapping bitmap (LMB) to represent a buffered data to link mapping (BLM) element may introduce overhead. When a BLM element includes an LMB, the size of the LMB can be represented as N_TIM*N_bitmap, where N_TIM denotes the number of AIDs whose corresponding TIM bit is set to a specific value (e.g., 1), and N_bitmap denotes the size of LMB per AID (LMBperAID). If there are legacy STAs or a single-link STA associated with an AP multi-link device (MLD) as there is only one communications link for those STAs, the AP MLD does not need to indicate a specific communications link to use for retrieving the buffered data. Consequently, the legacy or the single-link STAs may not check a BLM element even if the BLM element is included in a beacon frame. In addition, in a BLM element that includes an LMB, if the location of the "LMBperAID" for a specific non-AP MLD is determined implicitly (e.g., without explicit AID indication), every STA needs to have the same size of the LMBperAID. LMBperAID for legacy STAs or single-link STAs needs to have the size of N_bitmap, which gives non-necessary indication overhead.

In some embodiments, a buffered data to link mapping (BLM) element includes a first field indicating information on an AID that corresponds to the first LMBperAID in a corresponding Link Mapping bitmap (LMB) and the corresponding LMB. The information on an AID can be indicated in multiple different ways, which include (but not limited to), AID that corresponds to the first LMBperAID, the highest AID that corresponds to a bit position in the partial virtual bitmap of a corresponding TIM element that the LMBperAID is skipped, the Lowest AID that corresponds to a bit position in the partial virtual bitmap of the corresponding TIM element that is considered in deriving the LMBperAID, and the number of a specific value (e.g., "1") in the partial virtual bitmap of the corresponding TIM element (e.g., in the front of the bitmap) that the LMBperAID is skipped. In some embodiments, the corresponding LMB includes a union of LMBperAID for those AIDs that the partial virtual bitmap of the corresponding TIM element is set to a specific value (e.g., 1), which indicates buffered data to be delivered from an AP MLLE or an AP MLD, from the AID indicated by the first field. In an example operation, an AP MLD (e.g., the AP MLD 102) or an AP MLD, maintains two groups of AIDs, i.e., a first group of AIDs and a second group of AIDs. The first group of AIDs may correspond to STAs that do not support multi-link capability, STAs that operate on a single-link, STAs that support multi-link operation but only one communications link is enabled, and/or STAs that all traffic identifiers (TIDs) are mapped to all setup links. The second group of AIDs may correspond to STAs that support multi-link operation, STAs that have more than one link setup with the AP MLLE or the AP MLD, STAs that have more than one communications link enabled, and/or STAs that specific TID-to-link mapping has been negotiated with the AP MLLE or the AP MLD. The highest AID of the first group of AIDs may be smaller than the lowest AID of the second group of AIDs. In some embodiments, the first field indicates an AID that is equal to or smaller than the lowest AID of the second group of AIDs. In addition, the first field may be higher than the highest AID of the first group of AIDs.

Figure 9:
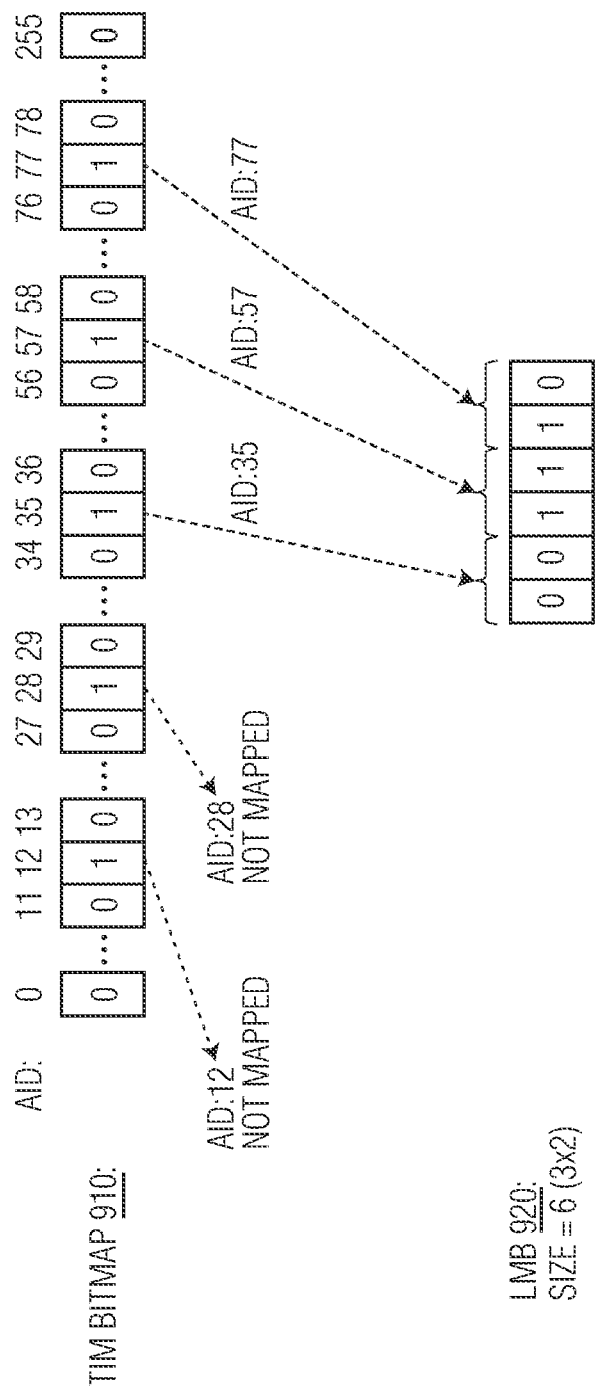
FIG. 9 depicts a TIM bitmap and a corresponding LMB that can be used in a multi-link operation by the multi-link communications system depicted in FIG. 1.

FIG. 9 depicts a TIM bitmap 910 and a corresponding link mapping bitmap (LMB) 920 that can be used in a multi-link operation by the multi-link communications system 100 depicted in FIG. 1. In the example depicted in FIG. 9, an AP multi-link device (e.g., the AP MLD 102) is associated with 256 STA MLDs and supports four communications links. The AP MLD 102 may generate the TIM bitmap for the associated 256 STA MLDs with different AIDs and the LMB for STA MLDs for which the AP MLD 102 or a corresponding AP MLD has buffered data. As depicted in FIG. 9, each LMB per AID is composed of two bits. AID 1-30 are assigned to legacy STAs and single-link STAs, while AID 31-255 are assigned to non-AP MLLEs or MLDs. Out of the 256 STA MLDs, the AP MLD 102 or a corresponding AP MLD has buffered data for 5 STA MLDs, which have corresponding AIDs, 12, 28, 35, 57, and 77. AID 12 and AID 28 are of legacy STAs and AIDs 35, 57, 77 are of non-AP MLDs or MLDs. The size of the LMB goes down to only 6 bits (i.e., 3 non-AP MLD or MLD×2 bit per non-AP MLD).

In some embodiments, a buffered data to link mapping (BLM) element includes the number of LMBperAID in a corresponding link mapping bitmap (LMB) and the corresponding LMB. The LMB may be a union of LMBperAID for those AIDs that the partial virtual bitmap of a corresponding TIM element is set to a specific value (e.g., 1), which indicates buffered data to be delivered from an AP MLLE or an AP MLD, which may be from the AID indicated by the first field. In an example operation, an AP MLLE or an AP MLD, maintains two groups of AIDs, i.e., a first group of AIDs and a second group of AIDs. The first group of AIDs may correspond to STAs that do not support multi-link capability, STAs that operate on a single-link, STAs that support multi-link operation but only one communications link is enabled, or STAs that all TIDs are mapped to all setup links. The second group of AIDs may correspond to STAs that support multi-link operation, STAs that have more than one link setup with the AP MLD, STAs that have more than one communications link enabled, STAs that specific TID-to-link mapping has been negotiated with the AP MLLE or the AP MLD. The lowest AID of the first group of AIDs may be higher than the highest AID of the second group of AIDs. In some embodiments, the number of LMBperAID indicates a number that is equal to (or greater than) the number of AIDs within the second group of AIDs that a bit in the partial virtual bitmap of a corresponding TIM element is set to a specific value (e.g., 1), indicating buffered data to be delivered from an AP MLLE or an AP MLD.

Figure 10:
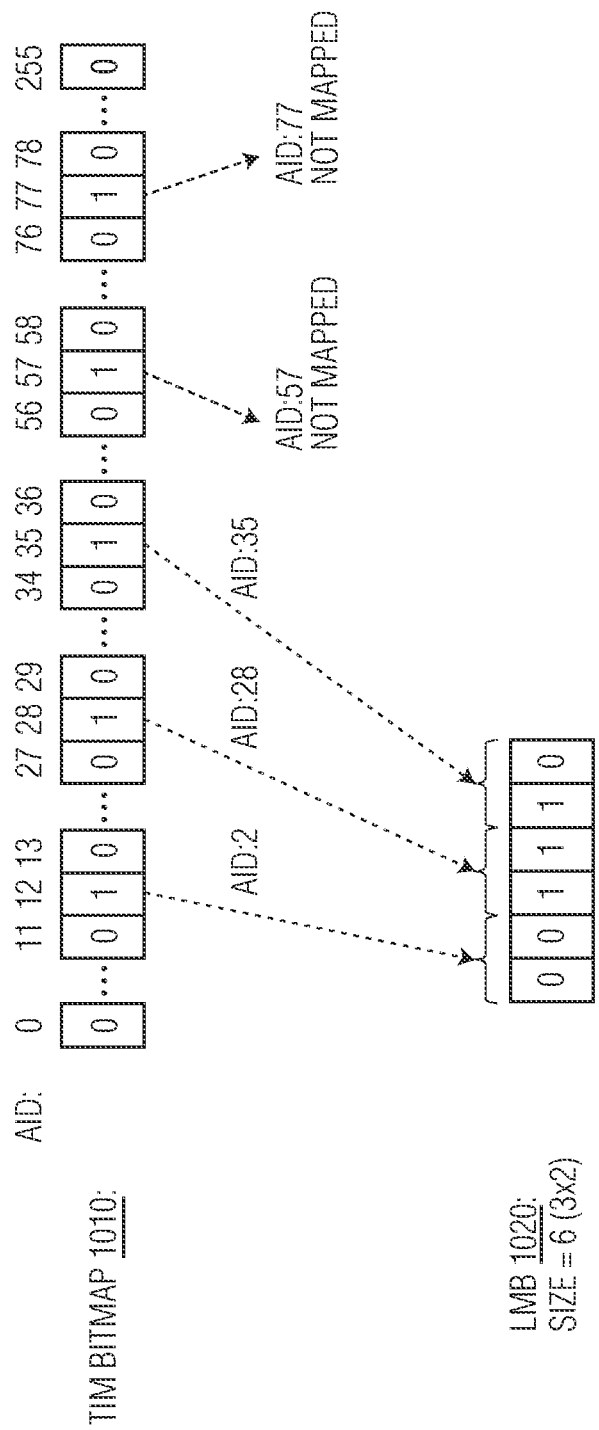
FIG. 10 depicts a TIM bitmap and a corresponding LMB that can be used in a multi-link operation by the multi-link communications system depicted in FIG. 1.

FIG. 10 depicts a TIM bitmap 1010 and a corresponding link mapping bitmap (LMB) 1020 that can be used in a multi-link operation by the multi-link communications system 100 depicted in FIG. 1. In the example depicted in FIG. 10, an AP multi-link device (e.g., the AP MLD 102) is associated with 256 STA MLDs and supports four communications links. The AP MLD 102 may generate the TIM bitmap for the associated 256 STA MLDs with different AIDs and the LMB for STA MLDs for which the AP MLD 102 has buffered data. As depicted in FIG. 10, each LMB per AID is composed of two bits. AID 1-50 are assigned to non-AP MLLEs or MLDs, while AID 51-255 are assigned to legacy STAs and single-link STAs. Out of the 256 STA MLDs, the AP MLD 102 or a corresponding AP MLD has buffered data for 5 STA MLDs, which have corresponding AIDs, 12, 28, 35, 57, and 77. AID 12, AID 28 and AID 35 are for non-AP MLLEs or MLDs and AIDs 57, 77 are for legacy STAs. The size of the LMB is 6 bits (i.e., 3 non-AP MLLE or MLD×2 bit per non-AP MLLE or MLD).

In some embodiments, in a TIM element, a first N bits of the partial virtual bitmap indicates if one or more group addressed MAC Protocol Data Units (MPDUs)/MAC Protocol Data Units (MMPDUs) are buffered at a corresponding AP. These N bits may not correspond to specific AIDs. Consequently, the first N bits that correspond to group addressed MSDUs/MMPDUs may need to be considered differently in link mapping compared to unicast MSDUs/MMPDUs. In some embodiments, an LMB does not include an LMBperAID for those AIDs that correspond to the group addressed MSDUs/MMPDUs in the partial virtual bitmap of a corresponding TIM element. If a buffered data to link mapping (BLM) element includes a first field indicating information on an AID that corresponds to the first LMBperAID in a corresponding Link Mapping bitmap (LMB) and the corresponding LMB, and the first N bits of the partial virtual bitmap is used for the indication of the group addressed frames, the first field shall indicate an AID that is greater than N. In some embodiments, the number of bits for LMBperAID for AIDs that correspond to the group addressed frames is indicated. In some embodiments, the number of bits for LMBperAID for AIDs that correspond to the group addressed frames may be equal to the number of bits for LMBperAID for individually addressed frames. In some other embodiments, the number of bits for LMBperAID for AIDs that correspond to the group addressed frames may be different from the number of bits for LMBperAID for individually addressed frames.

In a conventional TIM element, the bits 1 to $2^N-1$ of the bitmap are used to indicate that one or more group addressed frames, which are buffered for each AP corresponding to a non-transmitted basic service set identifier (BSSID). As the bit 0 of the bitmap is used to indicate the group addressed frames corresponding to a transmitted BSSID, the bits 0 to $2^N-1$ of the bitmap are used to indicate the group addressed frames. If an AP MLLE or MLD supports more than one communications link, and there is more than one AP affiliated with the AP MLLE or MLD on a communications link, it may not be clear how to indicate the group addressed frames on other communications links.

In some embodiments, in a TIM element that is transmitted on a first communications link, a first N1 (N1 being a positive integer) bits of a partial virtual bitmap indicate if one or more group addressed MSDUs/MMPDUs are buffered at an AP multi-link device (e.g., the AP MLD 102) on the first communications link. Bit 0 of the partial virtual bitmap may correspond to the transmitted BSSID of the AP MLD on the first communications link. Bits 1-(N1−1) of the partial virtual bitmap may correspond to the non-transmitted BSSID of the AP MLD on the first communications link.

In some embodiments, in a TIM element, a first N bits of a partial virtual bitmap indicate if one or more group addressed MSDUs/MMPDUs are buffered at an AP multi-link device (e.g., the AP MLD 102). Each bit starting from bit N in the traffic indication virtual bitmap may correspond to individually addressed traffic buffered for a specific STA or non-AP MLD within any basic service set (BSS) corresponding to a transmitted or non-transmitted BSSID at the time a corresponding beacon frame is transmitted. Each bit within the first N bits may indicate if one or more group addressed frames are buffered at each different AP affiliated with the AP MLD. Different APs can be of a transmitted BSSID. Different APs can be of a non-transmitted BSSID. Different APs can be on the same communications link on which a corresponding beacon frame that carries the TIM element is transmitted. Different APs can be on different communications links from the communications link in which a corresponding beacon frame that carries the TIM element is transmitted. In an example operation, an AP multi-link device (e.g., the AP MLD 102) supports two communications links, i.e., link0 and link1. There may be 7 non-transmitted BSSIDs on link0 of the AP MLD, while there may be 3 non-transmitted BSSIDs on link1 of the AP MLD. The first 12 bits of the AIDs may be allocated for group addressed frames. For a TIM element transmitted on link0, AID0 corresponds to transmitted BSSID on link0, AIDs 1-7 correspond to non-transmitted BSSID on link0, AID8 corresponds to transmitted BSSID on link1, and AIDs 9-11 correspond to non-transmitted BSSID on link1. For a TIM element transmitted on link1, AID0 corresponds to transmitted BSSID on link1, AIDs 1-3 correspond to non-transmitted BSSID on link1, AID4 corresponds to transmitted BSSID on line0, and AIDs 5-11 correspond to non-transmitted BSSID on link0.

In some embodiments, in a TIM element, a first N_link*$2^K$ bits (where N, K are positive integers) of a partial virtual bitmap indicates if one or more group addressed MSDUs/MMPDUs are buffered at an AP multi-link device (e.g., the AP MLD 102), where N_link denotes the number of communications links that the AP MLD supports. For i-th, the AP MLD may have $2^{(n\_i)}-1$ non-transmitted BSSIDs and K is equal to (or greater than) max(n_i). In some embodiments, bit 0 of the partial virtual bitmap corresponds to the transmitted BSSID of the AP MLD on the communications link that the TIM element is carried. Bit m*$2^K$ (1<=m<=N_link-1) of the partial virtual bitmap may correspond to the transmitted BSSID of the AP MLD on the communications link that the TIM element is not carried. The bit positions that are not mapped to specific BSSID of the AP MLD may be reserved and set to 0. In an example operation, an AP MLD supports two communications links, i.e., link0 and link1. There may be 7 non-transmitted BSSIDs on link0 of the AP MLD (n0=3), while there may be 3 non-transmitted BSSIDs on link1 of the AP MLD (n1=2). Subsequently, N_link=2 and K=max(2,3)=3. Consequently, the first 16 bits of the AIDs are allocated for group addressed frames. For a TIM element transmitted on link0, AID0 corresponds to transmitted BSSID on link0, AIDs 1-7 correspond to non-transmitted BSSID on link0, AID8 corresponds to transmitted BSSID on link1, AIDs 9-11 correspond to non-transmitted BSSID on link1, and AIDs 12-15 correspond to no BSSID and are set to 0. For a TIM element transmitted on link1, AID0 corresponds to transmitted BSSID on link1, AIDs 1-3 correspond to non-transmitted BSSID on link1, AIDs 4-7 correspond to no BSSID and are set to 0, AID8 corresponds to transmitted BSSID on link0, and AIDs 9-15 correspond to non-transmitted BSSID on link0.

In some embodiments, in a TIM element that is transmitted on a first communications link, a first N1 bits of a partial virtual bitmap indicate if one or more group addressed MSDUs/MMPDUs are buffered at an AP multi-link device (e.g., the AP MLD 102) on the first communications link. Bit 0 of the partial virtual bitmap may correspond to the transmitted BSSID of the AP MLD on the first communications link. Bit 1–(N1-1) of the partial virtual bitmap may correspond to the non-transmitted BSSID of the AP MLD on the first communications link. The AP MLD may explicitly indicate the bit position in the partial virtual bitmap for an AP affiliated with the AP MLD on a communications link that is different from the first communications link.

IEEE 802.11be protocol defines a directional-based TID-to-link mapping mechanism among the setup links of a multi-link device (MLD). By default, after the multi-link setup, all TIDs are mapped to all setup links. The multi-link setup may include the TID-to-link mapping negotiation. TID-to-link mapping can have the same or different link-set for each TID unless a non-AP MLD indicates that it requires to use the same link-set for all TIDs during the multi-link setup phase. The TID-to-link mapping can be updated after multi-link setup through a negotiation, which can be initiated by any MLD. When the responding MLD cannot accept the update, it can reject the TID-to-link mapping update. Therefore, depending on TID-to-link mapping, TIM indication may need to be different. If all TIDs are mapped to all setup links, there is no need to indicate additional TID-to-link mapping. If there is specific TID-to-link mapping configured, a beacon frame needs to have TID-to-link mapping information. In some embodiments, an AP multi-link device (e.g., the AP MLD 102) indicates if a bit in a partial virtual bitmap of a TIM element transmitted on a communications link indicates if any individually addressed buffered units (BUs) for a non-AP multi-link device (e.g., the non-AP MLD 104) are buffered by the AP MLD or by an AP affiliated with the AP MLD on the communications link.

When a non-AP MLD (e.g., the non-AP MLD 104) associates with an AP MLD (e.g., the AP MLD 102), one of APs affiliated with the AP MLD may indicate in a beacon frame if the AP MLD has buffered data to be delivered to the non-AP MLD. The indication may use a TIM element in the beacon frame and/or additional element. The information in a beacon frame may include information regarding whether or not an AP MLD has buffered data to be delivered to a non-AP MLD and/or information regarding which communications link is to be used for the delivery of the buffered data. If a station (STA) affiliated with a non-AP MLD receives a beacon frame and identifies that a corresponding AP MLD has buffered data on one or more links, the non-AP MLD can indicate that STAs affiliated with the non-AP MLD corresponding to the one or more links are in an awake state and initiate downlink transmission from the AP MLD, which can be done by sending a frame, such as, a PS-Poll frame, a QoS Null frame, etc. The frame sent on one communications link can indicate the awake state of other STAs affiliated with the non-AP MLD.

When a STA affiliated with a non-AP MLD sends a frame, the STA may also indicate its (preferred) status of each STA within the non-AP MLD. For example, each bit in a link bitmap may indicate that the STA in the corresponding link is in an awake state or a doze state (e.g., a power saving state). After receiving a TIM indication from a corresponding AP MLD, the non-AP MLD may transmit a frame, such as, a PS-Poll frame or a QoS Null frame, where the frame includes the link bitmap indicating which STA(s) will be in awake and which STA(s) will be in doze state. After receiving the frame from the STA, the AP MLD transmits downlink frames only on the communications link that the STA is in awake state.

For a multi-link operation, one or more communications links can be mapped to each traffic identifier (TID). When an AP MLD sends TIM information in a beacon frame, a bit within a TIM bitmap corresponding to a non-AP MLD of a communications link is set to a specific value (e.g., 1) if the AP MLD has buffered data of any TID for the non-AP MLD on the communications link. If a TID is mapped to more than one communications link, and if an AP MLD has buffered data of the TID for a non-AP MLD, a bit within the TIM bitmap of all the link mapped to the TID for the non-AP MLD is set to a specific value (e.g., 1). If N (N>1) links are mapped to a TID, the non-AP MLD can send a frame indicating that less than N STAs affiliated with the non-AP MLD are in awake state to save power consumption. However, if only one communications link is mapped to a TID, the non-AP MLD needs to send a frame indicating that the STA corresponding to the link is in awake state. However, a TIM bitmap may not contain information on buffered data's TID. If different TIDs are mapped to different communications links, and there are buffered data from more than one TID in the AP MLD side, it may be difficult for a non-AP MLD to decide which communications link to stay in the doze state. For example, for an AP MLD that has 3 links—[A, B, C], a non-AP MLD TID0/1/2/3 are mapped to [A,B,C]/[A]/[B]/[C]. In this example, if the AP MLD has buffered data of TID0, the TIM bitmap for links A/B/C for the non-AP MLD is set to a specific value (e.g., 1). The non-AP MLD may set some of communications links to doze state. If the AP MLD has buffered data of TID1, TID2, and TID3, the TIM bitmap for links A/B/C for the non-AP MLD is set to a specific value (e.g., 1). If the non-AP MLD sets some of communications links to doze state, the non-AP MLD cannot receive the buffered data units corresponding to the TID. Therefore, for the same TIM bit setting, the non-AP STA may need to act differently. Without knowing TID information, the non-AP STA cannot set any of links to doze state.

In some embodiments, an AP multi-link device (e.g., the AP MLD 102) is configured to include TID information that the AP MLD has a buffered data unit for a non-AP multi-link device (e.g., the non-AP MLD 104) in an AP MLD's broadcast frame (such as a beacon frame). When the non-AP MLD 104 identifies the TID information indicating that the AP MLD has a buffered data unit for the non-AP MLD, the non-AP MLD may send a frame indicating which STA(s) affiliated with the non-AP MLD will be in awake state. In some embodiments, the AP MLD is configured to include a TIM bitmap having a TIM bit that is set to 1 if the AP MLD has buffered data for a corresponding non-AP MLD in a broadcast frame. For those non-AP MLD whose TIM bit is set to 1, another field (e.g., another bitmap) may be included to indicate the combination of TIDs for that the AP MLD has buffered data. In some embodiments, the field may include a TID bitmap, which is a list of bitmaps for each non-AP MLDs that the TIM bit is set to 1. In some embodiments, each state may indicate the buffered data status of a group of TIDs. For example, more than one TID may be mapped to a specific bit within a bitmap for a non-AP MLD. In some embodiments, the AP MLD is configured to maintain a TID bitmap of 4 bits for each non-AP MLD, and the k-th bit of the bitmap indicates the status of TID_(2k), and TID_(2k+1). When the non-AP MLD sends a frame indicating which STA(s) affiliated with the non-AP MLD will be in awake state, the non-AP MLD may set at least one STA in awake state for each indicated TID for which the AP MLD has buffered data.

Figure 11:
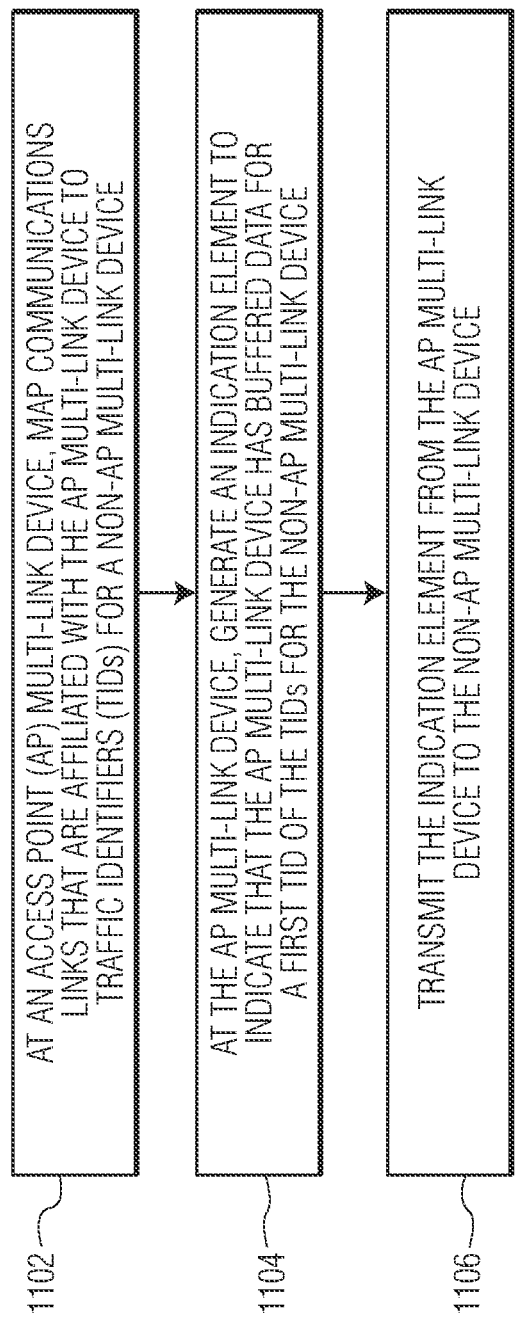
FIG. 11 is a process flow diagram of a method of multi-link communications in accordance to an embodiment of the invention.

FIG. 11 is a process flow diagram of a method of multi-link communications in accordance to an embodiment of the invention. According to the method, at block 1102, at an AP multi-link device, communications links that are affiliated with the AP multi-link device are mapped to traffic identifiers (TIDs) for a non-AP multi-link device. At block 1104, at the AP multi-link device, an indication element to indicate that the AP multi-link device has buffered data for a first TID of the TIDs for the non-AP multi-link device is generated. At block 1106, the indication element is transmitted from the AP multi-link device to the non-AP multi-link device. In some embodiment, the indication element is broadcasted from the AP multi-link device in a broadcasting frame, which may be a beacon frame. In some embodiments, the AP multi-link device receives a station operation status indication from the non-AP multi-link device. The station operation status indication may contain information regarding which station affiliated with the non-AP multi-link device is to be in an awake state. In some embodiments, the buffered data is transmitted from the AP multi-link device to the non-AP multi-link device through one of the communications links that corresponds to the first TID when a station of the non-AP multi-link device operating on the one of the communications links associated with the first TID is to be in the awake state. The AP multi-link device may set a corresponding traffic indication map (TIM) component of the non-AP multi-link device to a specific value. For example, the corresponding TIM component includes a TIM bit, and the specific value is 1. In some embodiments, the indication element includes a bitmap. In some embodiments, the AP multi-link device transmits the buffered data to the non-AP multi-link device through one of the communications links that does not correspond to the first TID when no station of the non-AP multi-link device operating on any of the communications links associated with the first TID is to be in an awake state. In some embodiments, the AP multi-link device and the non-AP multi-link devices are compatible with an IEEE 802.11 protocol. The AP multi-link device may be similar to, the same as, or a component of the AP MLD 102 depicted in FIG. 1. The non-AP multi-link devices may be similar to, the same as, or a component of the non-AP MLDs 104-1, 104-2, 104-3 depicted in FIG. 1.

Figure 12:
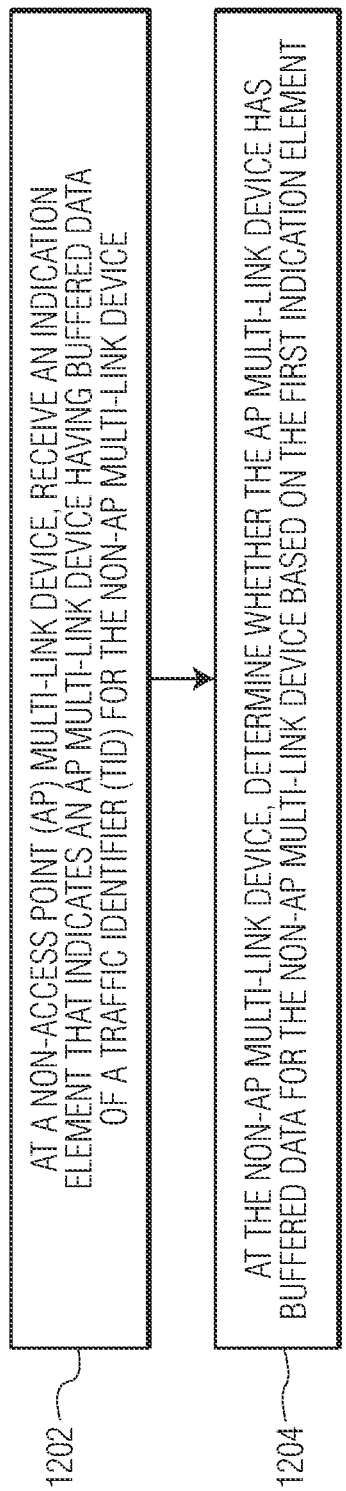
FIG. 12 is a process flow diagram of a method of multi-link communications in accordance to an embodiment of the invention.

FIG. 12 is a process flow diagram of a method of multi-link communications in accordance to an embodiment of the invention. According to the method, at block 1202, at a non-AP multi-link device, an indication element that indicates an AP multi-link device having buffered data of a traffic identifier (TID) for the non-AP multi-link device is received. In some embodiments, the non-AP multi-link device receives the indication element in a broadcasting frame (e.g., a beacon frame) from the AP multi-link device. At block 1204, at the non-AP multi-link device, whether the AP multi-link device has buffered data for the non-AP multi-link device based on the first indication element is determined. In some embodiments, the non-AP multi-link device transmits a station operation status indication to the AP multi-link device. The station operation status indication may contain information regarding which station affiliated with the non-AP multi-link device is to be in an awake state. In some embodiments, the non-AP multi-link device receives the buffered data from the AP multi-link device through a communications link that corresponds to the TID when a station associated with the TID is to be in the awake state. The non-AP multi-link device may set a station of the non-AP multi-link device operating on the communication link associated with the TID to the awake state when transmitting the station operation status indication from the non-AP multi-link device to the AP multi-link device. In some embodiments, the non-AP multi-link device receives a traffic indication map (TIM) component of the non-AP multi-link device. In some embodiments, the indication element comprises a bitmap. In some embodiments, the non-AP multi-link device receives the buffered data from the AP multi-link device through a communications link that does not correspond to the TID when no station operating on the communication link associated with the TID is to be in an awake state. In some embodiments, the AP multi-link device and the non-AP multi-link devices are compatible with an IEEE 802.11 protocol. The AP multi-link device may be similar to, the same as, or a component of the AP MLD 102 depicted in FIG. 1. The non-AP multi-link device may be similar to, the same as, or a component of the non-AP MLDs 104-1, 104-2, 104-3 depicted in FIG. 1.

In some embodiments, two groups of communications links (e.g., primary and secondary communications links) are defined for each TID. A first group of links may include one or more links within supported links of an AP multi-link device (e.g., the AP MLD 102). The TIM bit of the one or more links may be set to 1 if the AP MLD has a buffered data unit for the TID. A second group of links may include one or more links within the AP MLD's supported links. The TIM bit of the one or more links may not be set to 1 if the AP MLD has a buffered data unit for the TID. If the AP MLD has a buffered data unit of a TID for a non-AP multi-link device (e.g., the non-AP MLD 104), the AP MLD may set the TIM bit of the first group of links for the non-AP MLD to 1. The TIM bit of the second group of links for the non-AP MLD may be set to 0. Each STA of the first group of links affiliated with the non-AP MLD may be set to awake state. Each STA of the second group of links affiliated with the non-AP MLD may be set to doze state. During the data exchange on the first group of links, the non-AP MLD may indicate that STA corresponding to the second group of links may transit to awake state and the data exchange can be extend to the second group of links. In some embodiment, the AP MLD 102 and the non-AP MLD 104 may negotiate if the TIM bit of the second group of links for a TID will be set to 1 or 0 when the AP MLD has a buffered data unit for the TID. The non-AP MLD may indicate its capability/preference on setting the TIM bit of the second group of links for a TID when the AP MLD has a buffered data unit for the TID. This indication can be done during multi-link association. (Re)-Association Request frame may be used to deliver this information. For a TID, the partitioning between the first group of links and the second group of links may be done in static way or in dynamic way. In static way, the non-AP MLD associates with the AP MLD and/or the multi-link status changes. In a dynamic way, after association, the partitioning may be updated from time to time depending on the non-AP MLD's power save operation. A variant of an A-control field of a frame can indicate the update. In some embodiments, the non-AP MLD may indicate its capability/preference on setting the TIM bit of the second group of links for a TID when the AP MLD has a buffered data unit for the TID. For example, the second group of links may be set to 1 when the AP MLD has buffered data for a TID. The second group of links may be set to 0 when the AP MLD has a buffered data unit for a TID. The AP MLD may decide if the second group of links will be set to 1 when the AP MLD has buffered data for a TID. The size of the first group of links may be 1, which implies that there is only one "primary" link for each TID. The second group of links may be sub-divided into two categories. For example, one or more links within the AP MLD's supported links that a TIM bit of the one or more links may be set to 0 if the AP MLD has buffered data for the TID. One or more links within the AP MLD's supported links that TIM bit of the one or more links may be set to 1 if the AP MLD has buffered data for the TID.

In some embodiments, if an AP multi-link device (e.g., the AP MLD 102) has buffered data of a TID for a non-AP multi-link device (e.g., the non-AP MLD 104) and if all STA affiliated with the non-AP MLD corresponding to the TID are in doze state, the buffered data of the TID is delivered using other link(s) associated with the non-AP MLD that is in awake state. In an example operation, for the non-AP MLD, TID0 and TID1 are mapped to link A and link B, respectively. The AP MLD has buffered data of both TID0 and TID1 for the non-AP MLD, and consequently, the AP MLD sends TIM information in a beacon frame, where the TIM bit of Link A and Link B corresponding to the non-AP MLD is set to 1. The non-AP MLD may send a PS-Poll frame indicating that only STA on the Link A is in active state. The AP MLD can transmit an aggregated MAC protocol data unit (AMPDU) that aggregates the buffered data unit of TID0 and TID1 on Link A.

In some embodiments, if all STAs affiliated with a non-AP multi-link device (e.g., the non-AP MLD 104) mapped to a TID are in doze state, an AP multi-link device (e.g., the AP MLD 102) sends an A-MPDU including one or more MPDUs with the TID on a link. In an embodiment, the TID of the one or more MPDUs are not mapped to the link. In an embodiment, the TID of the one or more MPDUs corresponds to an access category (AC) that is not higher priority with respect to a primary AC on the link. In some embodiments, if all STAs affiliated with the non-AP MLD mapped to a TID are in doze state, the AP MLD sends an A-MPDU including only one or more MPDUs of the TID on a link that the TID is not mapped. If an AP MLD has a buffered data unit of a TID for a non-AP MLD and if the non-AP MLD reports that all STA affiliated with the non-AP MLD corresponding to the TID are in doze state, the buffered data unit of the TID may be delivered using other link(s) associated with the non-AP MLD that is in awake state.

In some embodiments, if an AP multi-link device (e.g., the AP MLD 102) indicates in a frame that the AP MLD has a buffered data of a TID for a non-AP multi-link device (e.g., the non-AP MLD 104) and if the AP MLD does not receive an indication from the non-AP MLD that at least one of STAs affiliated with the non-AP MLD corresponding to the TID is in active state until a predetermined time, the buffered data of the TID is delivered using other link(s) associated with the non-AP MLD that is in awake state. The predetermined time may be from the end of transmission of the frame. In some embodiments, the predetermined time is negotiated when the non-AP MLD associated with the AP MLD or the multi-link configuration is changed.

In some embodiments, an AP multi-link device (e.g., the AP MLD 102) indicates the TID related buffer status information. When the AP MLD sends TIM information (e.g., a TIM bitmap) in a frame (e.g., a beacon frame) on a first communications link, a bit within the TIM information corresponding to a non-AP multi-link device (e.g., the non-AP MLD 104) of a link is set to 1 if the AP MLD has buffered data of any TID for the non-AP MLD. The non-AP MLD may send a second frame (e.g., a PS-Poll frame or a QoS Null frame) to the AP MLD through a communications link indicating that the non-AP MLD is in active state on the communications link. The AP MLD may transmit a third frame to the non-AP MLD on the communications link, where the third frame includes information on which TID(s) the AP MLD has buffered data. In an example operation, the AP MLD has 3 links—[A, B, C]. For the non-AP MLD, TID0/1/2/3 are mapped to [A,B,C]/[A]/[B]/[C]. Assuming that the AP MLD has buffered data units of TID0 and TID2 to the non-AP MLD, the AP sends a beacon frame indicating that the TIM bit for the non-AP MLD is set to 1, the non-AP MLD sends a PS-Poll frame on link A, and the AP MLD sends back an acknowledgement frame to the non-AP MLD in response to receiving the PS-Poll frame. The AP MLD may send an A-MPDU including MPDUs with TID 0 on link A. The A-MPDU may further include information regarding a current buffered data unit with TID0 and TID2. The non-AP MLD may indicate that the STAs affiliated with the non-AP MLD on link A and C go to doze state. Further data exchange may happen using link B only. In some embodiments, a QoS Control field of an A-MPDU subframe may include TID information of other frames than the frame body. For example, bits 8-15 of at least one applicable frame (sub)types may be mapped to TID bitmap that either AP MLD or non-AP MLD has buffered data. In some embodiments, a variant of an A-control field of an A-MPDU subframe may include TID information of other frames than the frame body. In some embodiments, information on which TID(s) the AP MLD has a buffered data unit is delivered in a data/control/management/Action frame. In some embodiments, in the third frame from the AP MLD, the information on which TID(s) the AP MLD has a buffered data unit is a bitmap, where each bit of the bitmap indicates a corresponding link of the AP MLD that the AP MLD can deliver the buffered data. The link bitmap may be used for the information on TID mapping instead.

Figure 13:
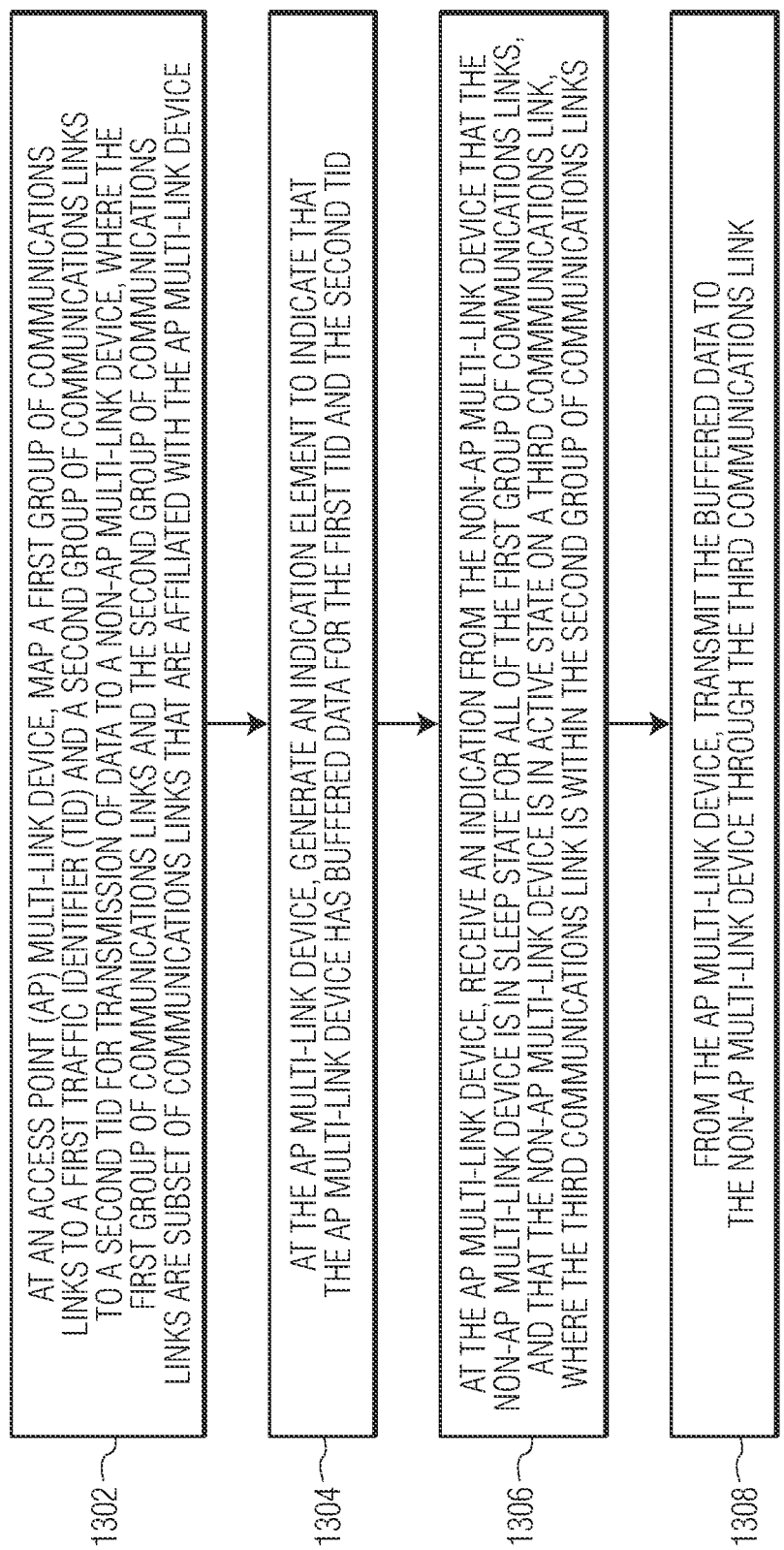
FIG. 13 is a process flow diagram of a method of multi-link communications in accordance to an embodiment of the invention.

FIG. 13 is a process flow diagram of a method of multi-link communications in accordance to an embodiment of the invention. According to the method, at block 1302, at an AP multi-link device, a first group of communications links are mapped to a first traffic identifier (TID) and a second group of communications links are mapped to a second TID for transmission of data to a non-AP multi-link device, where the first group of communications links and the second group of communications links are subset of communications links that are affiliated with the AP multi-link device. At block 1304, at the AP multi-link device, an indication element to indicate that the AP multi-link device has buffered data for the first TID and the second TID is generated. At block 1306, at the AP multi-link device, an indication from the non-AP multi-link device that the non-AP multi-link device is in sleep state for all of the first group of communications links, and that the non-AP multi-link device is in active state on a third communications link is received, where the third communications link is within the second group of communications links. At block 1308, from the AP multi-link device, the buffered data is transmitted to the non-AP multi-link device through the third communications link. In some embodiments, the buffered data is not transmitted through the first group of communications links. In some embodiments, the AP multi-link device and the non-AP multi-link device are compatible with an IEEE 802.11 protocol. The AP multi-link device may be similar to, the same as, or a component of the AP MLD 102 depicted in FIG. 1. The non-AP multi-link device may be similar to, the same as, or a component of the non-AP MLDs 104-1, 104-2, 104-3 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of multi-link communications, the method comprising:
   at an access point (AP) multi-link device, allocating a plurality of Association IDs (AIDs) to a plurality of non-AP multi-link devices, wherein each non-AP multi-link device is assigned a corresponding AID of the plurality of the AIDs; and
   at the AP multi-link device, generating a first indication element to indicate a buffered data configuration at the AP multi-link device for the non-AP multi-link devices, wherein each AID is associated with a respective component of the first indication element, the respective component set to a first value to indicate buffered data for an associated AID and set to a second value to indicate no buffered data for the associated AID, the components ordered in the first indication element by AID from lowest AID to highest AID.

2. The method of claim 1, further comprising:
   at the AP multi-link device, generating a second indication element to indicate communications link information associated with the buffered data configuration at the AP multi-link device, wherein the second indication element is a link mapping bitmap (LMB), each bit in the LMB indicates whether or not a respective communication link is to deliver the buffered data of the associated AID, and if the LMB indicates that no communication link is to deliver the buffered data, then one of a predetermined link and a multi-AP joint transmission is used to deliver the buffered data.

3. The method of claim 2, wherein at the AP multi-link device, generating the second indication element to indicate the communications link information associated with the buffered data configuration at the AP multi-link device comprises:
   at the AP multi-link device, generating a link mapping bitmap (LMB) for each of the AIDs whose corresponding non-AP multi-link device the AP multi-link device has a buffered data unit to be delivered to, wherein the LMB indicates a set of designated communications links through which the buffered data unit is to be delivered.

4. The method of claim 3, wherein the buffered data unit is an individually addressed buffered data unit.

5. The method of claim 2, further comprising from the AP multi-link device, transmitting the first indication element and the second indication element to the non-AP multi-link devices in a broadcast frame.

6. The method of claim 5, wherein the broadcast frame comprises a beacon frame.

7. The method of claim 2, wherein at the AP multi-link device, generating the second indication element to indicate the communications link information associated with the buffered data configuration at the AP multi-link device comprises:
   at the AP multi-link device, generating a link mapping bitmap (LMB) only for each of the AIDs whose corresponding non-AP multi-link device the AP multi-link device has an individually addressed buffered data unit to be delivered to, wherein the LMB indicates a designated set of communications links through which the individually addressed buffered data unit is to be delivered.

8. The method of claim 1, wherein at the AP multi-link device, generating the first indication element for the AIDs to indicate the buffered data configuration at the AP multi-link device for the non-AP multi-link devices comprises:
   at the AP multi-link device, for each AID of the AIDS, setting a corresponding traffic indication map (TIM) component to a specific value when the AP multi-link device has buffered data to be delivered to a corresponding non-AP multi-link device to which the AID is allocated.

9. The method of claim 8, wherein the corresponding TIM component comprises a TIM bit, and wherein the specific value is 1.

10. The method of claim 1, wherein the buffered data configuration at the AP multi-link device comprises information regarding an individually addressed buffered data unit and a group addressed buffered data unit at the AP multi-link device, and wherein at the AP multi-link device, generating the first indication element for the AIDs to indicate the buffered data configuration at the AP multi-link device for the non-AP multi-link devices comprises:
at the AP multi-link device, generating a traffic indication map (TIM) that includes a first section containing information regarding the individually addressed buffered data unit and a second section containing information regarding the group addressed buffered data, wherein the first and second sections have non-overlapping AID ranges within the AIDs.

11. The method of claim 1, wherein the AP multi-link device and the non-AP multi-link devices are compatible with an Institute of Electrical and Electronics Engineers (IEEE) 802.11 protocol.

12. A multi-link communications system comprising:
an access point (AP) multi-link device configured to:
allocate a plurality of Association IDs (AIDs) to a plurality of non-AP multi-link devices, wherein each non-AP multi-link device is assigned a corresponding AID of the plurality of the AIDs; and
generate an indication element to indicate a buffered data configuration at the AP multi-link device for the non-AP multi-link devices, wherein each AID is associated with a respective component of the indication element, the respective component set to a first value to indicate buffered data for an associated AID and set to a second value to indicate no buffered data for the associated AID, the components ordered in the indication element by AID from lowest AID to highest AID.

13. The multi-link communications system of claim 12, wherein the AP multi-link device and the non-AP multi-link devices are compatible with an Institute of Electrical and Electronics Engineers (IEEE) 802.11 protocol.

14. A method of multi-link communications, the method comprising:
at an access point (AP) multi-link device, mapping a plurality of communications links that are affiliated with the AP multi-link device to a plurality of traffic identifiers (TIDs) for a non-AP multi-link device;
at the AP multi-link device, generating a component of an indication element to indicate that the AP multi-link device has buffered data for a first TID of the TIDs for the non-AP multi-link device, wherein the component of the indication element is set to a first value to indicate that the AP multi-link device has buffered data for the first TID and set to a second value to indicate that the AP multi-link device has no buffered data for the first TID; and
transmitting the indication element from the AP multi-link device to the non-AP multi-link device based on the mapped communication link to the first TID,
wherein Association IDs (AIDs) are allocated to the non-AP multi-link devices, the indication element comprising a respective component for each AID, the components ordered in the indication element by AID from lowest AID to highest AID.

15. The method of claim 14, wherein transmitting the indication element from the AP multi-link device to the non-AP multi-link device associated with the first TID comprises:
broadcasting the indication element from the AP multi-link device in a broadcasting frame.

16. The method of claim 15, wherein the broadcast frame comprises a beacon frame.

17. The method of claim 14, further comprising:
receiving, by the AP multi-link device, a station operation status indication from the non-AP multi-link device, wherein the station operation status indication contains information regarding which station affiliated with the non-AP multi-link device is to be in an awake state.

18. The method of claim 17, further comprising:
transmitting the buffered data from the AP multi-link device to the non-AP multi-link device through one of the communications links that corresponds to the first TID when a station of the non-AP multi-link device operating on the one of the communications links associated with the first TID is to be in the awake state.

19. The method of claim 17, further comprising:
at the AP multi-link device, setting a corresponding traffic indication map (TIM) component of the non-AP multi-link device to a specific value.

20. The method of claim 19, wherein the corresponding TIM component comprises a TIM bit, and wherein the specific value is 1.

21. The method of claim 14, wherein the indication element comprises a bitmap.

22. The method of claim 14, further comprising:
transmitting the buffered data from the AP multi-link device to the non-AP multi-link device through one of the communications links that does not correspond to the first TID when no station of the non-AP multi-link device operating on any of the communications links associated with the first TID is to be in an awake state.

23. A method of multi-link communications, the method comprising:
at an access point (AP) multi-link device, mapping a first group of communications links to a first traffic identifier (TID) and a second group of communications links to a second TID for transmission of data to a non-AP multi-link device, wherein the first group of communications links and the second group of communications links are subset of communications links that are affiliated with the AP multi-link device;
at the AP multi-link device, generating an indication element to indicate that the AP multi-link device has buffered data for the first TID and the second TID, wherein a component of the indication element is set to a first value to indicate that the AP multi-link device has buffered data for the respective TID and set to a second value to indicate that the AP multi-link device has no buffered data for the respective TID;
at the AP multi-link device, receiving an indication from the non-AP multi-link device that the non-AP multi-link device is in sleep state for all of the first group of communications links, and that the non-AP multi-link device is in active state on a third communications link, wherein the third communications link is within the second group of communications links; and
from the AP multi-link device, transmitting the buffered data to the non-AP multi-link device through the third communications link,
wherein Association IDs (AIDs) are allocated to the non-AP multi-link devices, the indication element comprising a respective component for each AID, the components ordered in the indication element by AID from lowest AID to highest AID.

24. The method of claim 23, wherein the buffered data is not transmitted through the first group of communications links.

25. The method of claim 23, wherein the AP multi-link device and the non-AP multi-link device are compatible with an Institute of Electrical and Electronics Engineers (IEEE) 802.11 protocol.

* * * * *